United States Patent
Thompson et al.

(10) Patent No.: US 8,271,317 B2
(45) Date of Patent: Sep. 18, 2012

(54) METHOD OF ASSISTING A SALES REPRESENTATIVE IN SELLING

(75) Inventors: Keith T. Thompson, Oakville (CA); Christopher P. Hamoen, Mississauga (CA); Christopher S. Fales, Mississauga (CA); Darka O. Migus, Oakville (CA)

(73) Assignee: Ardexus Inc., Mississauga (CA)

( * ) Notice: Subject to any disclaimer, the term of this patent is extended or adjusted under 35 U.S.C. 154(b) by 0 days.

(21) Appl. No.: 13/067,952

(22) Filed: Jul. 11, 2011

(65) Prior Publication Data

US 2011/0270638 A1    Nov. 3, 2011

Related U.S. Application Data

(62) Division of application No. 11/790,928, filed on Apr. 30, 2007, now Pat. No. 7,979,305, which is a division of application No. 09/983,180, filed on Oct. 23, 2001, now Pat. No. 7,216,087.

(60) Provisional application No. 60/242,438, filed on Oct. 24, 2000.

(30) Foreign Application Priority Data

Oct. 23, 2000    (CA) ..................................... 2324119

(51) Int. Cl.
*G06Q 10/00* (2012.01)
(52) U.S. Cl. ..................................................... 705/7.29
(58) Field of Classification Search .................. 705/7.29
See application file for complete search history.

(56) References Cited

U.S. PATENT DOCUMENTS

| | | | |
|---|---|---|---|
| 2,706,349 | A | 9/1951 | Johnson et al. |
| 5,056,792 | A | 10/1991 | Helweg-Larsen et al. |
| 5,696,702 | A | 12/1997 | Skinner et al. |
| 5,717,865 | A | 2/1998 | Stratmann |
| 5,724,262 | A | 3/1998 | Ghahramani |
| 5,726,914 | A | 3/1998 | Janovski et al. |
| 5,774,868 | A | 6/1998 | Cragun et al. |
| 5,953,707 | A | 9/1999 | Huang et al. |
| 6,067,525 | A | 5/2000 | Johnson et al. |
| 6,236,977 | B1 * | 5/2001 | Verba et al. ................ 705/7.32 |

(Continued)

FOREIGN PATENT DOCUMENTS

JP    2003323542 A    11/2003

OTHER PUBLICATIONS

Houska, C.M. Effective Marketing Techniques for Small Industrial Companies. Plastics Engineering, v48, n11, p. 19. Nov. 1992. dialog file 148-6203717.

(Continued)

*Primary Examiner* — Johnna Loftis
(74) *Attorney, Agent, or Firm* — Dinesh Agarwal, P.C.

(57) ABSTRACT

A computer implemented method of providing feedback to a sales representative for a sales opportunity to a customer, comprising: determining, in dependence on information received from the sales representative, a probability that the sales opportunity will result in a sale by the sales representative; determining, in dependence on information received from the sales representative, a location on a sales cycle time line for the sales opportunity; assigning a priority to the sales opportunity in dependence on the location on the sales cycle time line and the probability that the sales opportunity will result in a sale; and rendering on a display a visual representation of the probability and the priority.

2 Claims, 27 Drawing Sheets

U.S. PATENT DOCUMENTS

| | | | |
|---|---|---|---|
| 6,636,852 | B2 | 10/2003 | Gozdeck et al. |
| 6,820,060 | B1 * | 11/2004 | Eisner .................... 705/7.31 |
| 6,920,464 | B2 | 7/2005 | Fox |
| 7,043,531 | B1 | 5/2006 | Seibel et al. |
| 7,155,424 | B2 | 12/2006 | Ikezawa et al. |
| 7,716,159 | B2 | 5/2010 | Mall et al. |

OTHER PUBLICATIONS

Marshall, Rebekkah; Ondrey, Gerald. Software and Services: Push the Sales Cycle Forward and Keep Staff Proactive. Chemical Engineering, v108, n11, p. 68D-21. Oct. 2001. dialog file 16-09116233.

Hennessey, Hubert D. Software Propels the Selling Cycle. Software Magazine, v8, n8, p. 57. Jun. 1988. dialog file 275-01250045.

Brooksbank, Roger. The Selling Skills Workbook. MArketing Intelligence & Planning v11, n9, p. 5-56. 1993. dialog file 15-000802764.

Wamberg, W.T. A Bonanza for the Next Millenium. Life Association News v93, n8, p. 106-109. Aug. 1998. dialog file 15-01677668.

Printout of Apr. 10, 2009 Top 15 CRM Software Awards announcement from ISM Inc. website at http://www.ismguide.com/pressDetail.php?id_pag=31 (6 pages).

Printouts of Jun. 30, 2009 press release and Salesways solution from Ardexus Inc. website at www.ardexus.com/ (6 pages).

Printouts of the Salesways solution from the website at www.salesways.com, accessed Jul. 31, 2009 (2 pages).

Selling Power magazine, Jun. 2009, pp. 1 and 61.

Sample screen display of Ardexus MODE product from the website at http://www.ardexus.com/LotusNotesCRM.htm#p24.

Office Action (Restriction Requirement) dated Apr. 14, 2008, in U.S. Appl. No. 11/790,928, filed Apr. 30, 2007.

Office Action dated Jun. 25, 2008, in U.S. Appl. No. 11/790,928, filed Apr. 30, 2007.

Office Action dated Mar. 5, 2009, in U.S. Appl. No. 11/790,928, filed Apr. 30, 2007.

Office Action dated Dec. 18, 2009, in U.S. Appl. No. 11/790,928, filed Apr. 30, 2007.

Notice of Allowance dated Mar. 3, 2011, in U.S. Appl. No. 11/790,928, filed Apr. 30, 2007.

Interview Summary dated May 19, 2011, in U.S. Appl. No. 11/790,928, filed Apr. 30, 2007.

Office Action (Restriction Requirement) dated Nov. 29, 2005, in U.S. Appl. No. 09/983,180, filed Oct. 23, 2001.

Office Action dated Mar. 8, 2006, in U.S. Appl. No. 09/983,180, filed Oct. 23, 2001.

Office Action dated Mar. 21, 2006, in U.S. Appl. No. 09/983,180, filed Oct. 23, 2001.

Notice of Allowance dated Dec. 14, 2006, in U.S. Appl. No. 09/983,180, filed Oct. 23, 2001.

* cited by examiner

Fig. 6a

| Probability Index | Will it happen? | Will we get it? |
|---|---|---|
| 1 | Low | Low |
| 2 | Low | Medium |
| 3 | Low | High |
| 4 | Medium | Low |
| 5 | Medium | Medium |
| 6 | Medium | High |
| 7 | High | Low |
| 8 | High | Medium |
| 9 | High | High |

| Probability Index | Probe | Prove | Close |
|---|---|---|---|
| 1 | Thorough probe needed<br>"Sale won't likely happen, but worth investing time to position yourself if it does"<br>Priority 2 | Normal prove Required<br>"Low probability sale. Don't waste too much time on it"<br>Priority 3 | This seems to be a hopeless close<br>"You are confident you will not get this sale. Check your evaluation, is it correct? – if so walk away"<br>Leave it alone |
| 2 | Probe Thoroughly<br>"Reasonable chance sale will happen. Probe to uncover issues that will advance your chances, or obstacles that might be hindering you"<br>Priority 2 | Intense proving needed<br>This sale may happen. The customer has to know why your proposal is better than the competitions"<br>Priority 2 | Low chance close<br>"A potential time waster. Check your evaluation. Its time to move on to more productive opportunities"<br>Leave it alone |
| 3 | Thorough probe is required<br>"Sale will happen but you are not highly favored. Work hard to discover issues that will make your proposal better accepted"<br>Priority 1 | Prove, prove, prove<br>"Sales cycle is developing, but you are still not well positioned. Now is the time to pull out all stops and try to distinguish yourself"<br>Break-through needed | Desperation close<br>"At this point the competition look like they will get this sale? Only something dramatic can rescue the situation!"<br>Break-through needed |
| 4 | Routine probe<br>"Low chance that the sale will happen, but we are early in the sales cycle. Extra effort to differentiate yourself will pay off if the situation improves"<br>Priority 2 | Normal proving required<br>"Low chance sale and we are positioned in the center. Try getting higher customer favor. Don't waste a lot of time"<br>Priority 3 | Routine close<br>"Cover your bases. You're in reasonable shape to make the sale if it happens"<br>Priority 3 |
| 5 | Determined probe<br>"You are well positioned in a sale that has reasonable chances of happening. Probe now to improve your competitive position"<br>Priority 2 | Determined prove needed<br>"This sale may happen. Need to strongly differentiate yourself from the competitors to improve your chances at winning this sale"<br>Priority 2 | Strong close may be needed<br>"There's still hope for this sale. Overcome any objections and be prepared for a strong close"<br>Priority 1 |
| 6 | Careful probe needed<br>"High probability sale. Use your best probing skills to put yourself ahead of the crowd early in the sales cycle"<br>Priority 1 | Strong proving needed<br>"The customer still doesn't see you as a highly differentiated solution. Convincing now will vastly improve your chances later"<br>Priority 1 | Make a determined close<br>"You are still not differentiated from the competition. Probe for objections, prove capability and try to close this order"<br>Priority 1 |
| 7 | Maintenance Probe<br>"You are highly favored, but the chances that the sales will happen are low. Probe enough to protect your position"<br>Priority 3 | Maintenance prove needed<br>"Do enough to ensure that you stay in front of the pack, in the event that the sale does happen"<br>Priority 3 | Maintenance close needed<br>"Cover your bases. Customer wants your product. Be ready to close if sales goes through"<br>Priority 3 |
| 8 | Maintenance probe needed<br>"Maintain your strong position with the customer. Ensure the situation is as you think it is"<br>Priority 2 | Maintenance prove<br>"You are well positioned to win. Do enough to maintain your position"<br>Priority 2 | Should be a routine close<br>"Stay close to the customer. You're in an excellent position to make a sale if it goes through"<br>Priority 2 |
| 9 | Simple probe<br>"Sale is very likely to happen and it looks as if you will get it - but don't get complacent and spoil your leading position"<br>Priority 2 | Straightforward prove<br>"Keep the momentum going. Eliminate any possible obstacles, objections, etc. You are in a commanding position. Get ready for an early close"<br>Priority 2 | Simple close<br>"The sale is yours – make the close and move onto the next"<br>Priority 1 |

Lotus Notes

SALES ENVIRONMENT

Probe | Prove | Close

To what degree have you established the customer's need for this product/service? [?]
What is the customer's level of need for this product/service? [?]
To what degree does your solution match the customer's need? [?]
How does your pricing strategy match the customer's budget? [?]
What are the chances that the customer will receive the money needed for this purchase? [?]
How familiar are you and your company with the customer's organization? [?]
What is the degree of competitive pressure in this sales opportunity? [?]
Who are the competitors? [?]

| | | |
|---|---|---|
| | | Med ▶ |
| | | Normal ▶ |
| | | High ▶ |
| | | Higher ▶ |
| | | Very High ▶ |
| | | Med ▶ |
| | | High ▶ |
| | ◀ ▶ | |
| | ✓ IBM | |
| | ✓ KODAK | |
| | MITA | |
| | PITNEY BOWES | |
| | SAVIN | |
| | SELEX | |
| | SHARP | |

Key decision makers [?]

| | | Influence | |
|---|---|---|---|
| Economic | Mohamed Ahmed ▶ | [A] Med ▶ | Important ▶ |
| Technical | Linda Bret-Carlise ▶ | [A] High ▶ | Price ▶ |
| User(s) | H. Longfelow ▶ | [A] Med ▶ | Specifications ▶ |
| | | | Support ▶ |

OK | Cancel

FIG. 17A

Lotus Notes

SALES ENVIRONMENT — 234

Probe | Prove | Close

Economic
M0hamed Ahmed

Relationship [OK ▶]  Influence: High  Important: Price
Degree of Proof  Not Convinced ⊙ ⊙ ○ ○ Convinced — 235

Technical
Linda Bret Carlise

Relationship [Bad ▶]  Influence: Low  Important: Specifications
Degree of Proof  Not Convinced ⊙ ○ ○ ○ Convinced — 235

User(s)
H. Longfellow

Relationship [Good ▶]  Influence: Med  Important: Performance
Degree of Proof  Not Convinced ⊙ ⊙ ⊙ ○ Convinced — 235

OK
Cancel

Lotus Notes
SALES ENVIRONMENT
Probe | Prove | Close

Have you attempted a trial close?  [Yes ▾]
Has the customer made a decision?  [No ▾]
What are the barriers to close?
  Price
  Service
  Package Deal
  Technical What is your strategy to overcome barriers? —2007

Have you enable your strategy?  [No ▾]

Previous Trial Close
| No | Barriers | Strategy |

[OK]
[Cancel]

236

| Will it Happen? | | Sales Environment | | |
|---|---|---|---|---|
| Salesperson | Advisor | Funding | Level of Need | Summary |
| High | Med | Certain | Low | Advisor Warning - The customer's need is low. |
| High | Med | Fair | Urgent | Advisor Warning - only an even chance of funding |
| High | Med | Fair | Normal | Advisor Warning - only an even chance of funding |
| High | Med | Low | Urgent | Advisor Warning - funding is at risk |
| High | Low | Fair | Low | Advisor Warning - even chance of funding, but customer's need is low. |
| High | Low | Low | Normal | Advisor Warning - funding is at risk |
| High | Low | Low | Low | Advisor Warning - No Money + Low Need = NO SALE! |
| Med | High | Certain | Urgent | Advisor Alert - The customer has money and a need. This sale will happen |
| Med | High | Certain | Normal | Advisor Alert - The customer has money and this sale is very probable. |
| Med | Low | Fair | Low | Advisor Warning - even chance of funding, but customer's need is low. |
| Med | Low | Low | Normal | Advisor Warning - funding is at risk |
| Med | Low | Low | Low | Advisor Warning - This customer doesn't have money or need. This sale won't likely happen. |
| Low | High | Certain | Urgent | Advisor Alert - This sale will happen - the customer has money and a need. |
| Low | High | Certain | Normal | Advisor Alert - This sale will happen - the customer has money and a need. |
| Low | Med | Certain | Low | Advisor Alert - funding will happen - despite low need. |
| Low | Med | Fair | Urgent | Advisor Alert - customer has a need and might get money |

FIG.19A

| Will it Happen? | | Sales Environment | | |
|---|---|---|---|---|
| Salesperson | Advisor | Funding | Level of Need | Summary |
| Low | Med | Fair | Normal | Advisor Alert - even chance of funding. |
| Low | Med | Low | Urgent | Advisor Alert - urgent need, despite low chance of funding. |
| High | Med | Certain | Unknown | Advisor Warning - You don't know the customer's level of need. |
| High | Med | Unknown | Urgent | Advisor Warning - The funding status is unknown. |
| High | Low | Fair | Unknown | Advisor Warning - There is only an even chance of funding and the customer's need is unknown. |
| High | Low | Unknown | Normal | Advisor Warning - The funding status is unknown. |
| High | Low | Unknown | Low | Advisor Warning - This customer doesn't have need and funding is unknown. This sale is questionable. |
| High | Low | Low | Unknown | Advisor Warning - This customer doesn't have money and the need is unknown. This sale is questionable. |
| Med | Low | Fair | Unknown | Advisor Warning - The funding is uncertain and the customer's need is unknown. |
| Med | Low | Unknown | Normal | Advisor Warning - The funding status is unknown. |
| Med | Low | Unknown | Unknown | Advisor Warning - The funding status and level of need are unknown. |
| Low | Med | Certain | Unknown | Advisor Warning - The level of need is unknown. |
| Low | Med | Unknown | Urgent | Advisor Alert - The funding status is unknown. |

FIG.19B

CASE 3

Gut Feeling Index: 4,5, or 6
Computer Index: 1,2, or 3
Header Message: "Possible Strategies:"

| | | |
|---|---|---|
| User | User | User |
| Computer | Computer | Computer |

| PROBE | PROVE | CLOSE |
|---|---|---|
| "Remember that more intense probing can put you into a much better position as the sale progresses. You are a little optimistic on this one" | "You see yourself as reasonably positioned, but the Advisor thinks that you need to work harder to be in the running to win the sale" | "You need to re-evaluate your position immediately. If you don't, the customer may surprise you and the competition" |

FIG.20C

CASE 4

Gut Feeling Index: 1,2, or 3
Computer Index: 1,2, or 3
Header Message: "Possible Strategies:"

| | | |
|---|---|---|
| | | |
| User / Computer | User / Computer | User / Computer |

| PROBE | PROVE | CLOSE |
|---|---|---|
| "Since this is the Probe Phase it is worth investing time to try to improve your chances for later" | "You are in the prove phase but you are not a contender in this sale. There is still time to find some key differentiators in order to get consideration" | "You are in a tough situation with little time left and it doesn't look like you are going to get this sale. If you can't devise a Breakthrough, then Leave it Alone" |

FIG.20D

CASE 5

Gut Feeling Index: 4,5, or 6
Computer Index: 4,5, or 6
Header Message: "Possible Strategies:"

|       |       |       |
|-------|-------|-------|
| User / Computer | User / Computer | User / Computer |
|       |       |       |

| PROBE | PROVE | CLOSE |
|-------|-------|-------|
| "Uncover possible differentiators and determine the Sales Environment so you can achieve a better than ever position as you move into Prove" | "The customer still doesn't see you as a highly differentiated solution. You need to Prove more" | "You are still not differentiated from the competition. Probe for objections, prove capability and try to close this order" |

FIG.20E

CASE 6

Gut Feeling Index: 7,8, or 9
Computer Index: 7,8, or 9
Header Message: "Advisor agrees with you, but be alert and check following:"

|       |       |       |
|-------|-------|-------|
| User / Computer | User / Computer | User / Computer |
|       |       |       |

| PROBE | PROVE | CLOSE |
|-------|-------|-------|
| "It looks as if you will get it - but don't get complacent and lose your leading position" | "Keep the momentum going and eliminate any possible obstacles. You are in a commanding position. Get ready for an early close" | "Cover your bases. The customer wants your product. Make the close and move on to the next" |

FIG.20F

CASE 7

Gut Feeling Index: 1,2, or 3
Computer Index: 4,5, or 6
Header Message: "Possible Strategies:"

| | | |
|---|---|---|
| Computer | Computer | Computer |
| User | User | User |

| PROBE | PROVE | CLOSE - 1 |
|---|---|---|
| "You have a better chance than you think, but you can still improve your situation. More Probing is required" | "You are more pessimistic than the Advisor. As you are in the Prove Phase, you have time to improve your position with more intense effort" | "You had better check this out, as there is not much time left. The Advisor thinks you still have a chance. Re-evaluate your Sales Environment" |

FIG.20G

CASE 8

Gut Feeling Index: 1,2, or 3
Computer Index: 7,8, or 9
Title: "You should reconsider based on:"

| Computer | Computer | Computer |
|---|---|---|
| | | |
| User | User | User |

| PROBE | PROVE | CLOSE - 1 |
|---|---|---|
| "The Advisor thinks that you will get this sale if it goes through - you are pessimistic and should reevaluate your position." | "Your chances of getting this sale look better than you think - take another look at the Sales Environment" | "You are confident you will not get this sale. Check that the Sales Environment is correct - if so, it's time to move on to more productive opportunities" |

FIG.20H

CASE 9

Gut Feeling Index: 4,5, or 6
Computer Index: 7,8, or 9
Title: "You should reconsider based on:"

|  | Computer | Computer | Computer |
|---|---|---|---|
|  | User | User | User |
|  |  |  |  |

| PROBE | PROVE | CLOSE |
|---|---|---|
| "You're in good shape in this sale. Are sure you are not being a little pessimistic?" | "The Advisor thinks that you are highly differentiated. Check your assessment against the Sales Environment" | "The Advisor thinks that this sale is yours for the taking. Time is short, so it is very Important to check this out. Review the Sales Environment" |

FIG.20I

METHOD OF ASSISTING A SALES REPRESENTATIVE IN SELLING

This application is a divisional of and claims the benefit of U.S. patent application Ser. No. 11/790,928, filed Apr. 30, 2007 now U.S. Pat No. 7,979,305, which is a divisional of and claims the benefit of U.S. patent application Ser. No. 09/983,180, filed Oct. 23, 2001 and issued May 8, 2007 as U.S. Pat. No. 7,216,087, which is incorporated by reference, which claims the benefit of U.S. Provisional Application Ser. No. 60/242,438, filed Oct. 24, 2000, all of which are hereby incorporated herein in their entirety by reference.

BACKGROUND OF THE INVENTION

This invention relates to a method of assisting a sales representative in selling and a program storage device readable by a processor of a computer and a computerized sales automation system for use in implementing same.

Sales professionals are continually faced with the task of managing large amounts of information concerning details on customers, organizations, and situations in which they are actively selling their products and services. As computers have become much more powerful and more economical for companies to purchase, sales departments have equipped their sales representatives with computers. The use of computers to assist in sales is usually referred to as sales automation. The term "sales automation" has been used to cover a wide range of computer sales applications, from computer-based multimedia presentations to "Rolodex" type storage of customer information. Prior sales automation systems, however have shortcomings in helping the sales representative. For example, many are incapable of processing information regarding actual events or individual assessments of the sales situation to suggest winning strategies to change activities and, interactions, so as to improve the chances of winning the sale.

Applying computer technology to the sales force presents two main challenges: the first is choosing the correct computer environment to run the application software, and the second is to choose application software that is the most effective in assisting the sales representative to win more sales. A sales force is usually mobile, so portable computers (laptops) are the most convenient. Laptop computers should be equipped with modems in order for salespeople to communicate with head office and other remote team members. The entire sales team including managers, representatives, and support staff, should be connected or networked. Client-server systems, where a main database resides on a central server and the clients access the information in the database via the network, are the most widely chosen platforms. Some systems now use the Internet as the network of choice for communication.

Recently, a new type of software, called groupware, has become available. Groupware is specifically designed to allow a distributed group of people to work together effectively as a team. It has its own e-mail and can also facilitate group discussions electronically. These electronic communication functions are commonly referred to as "messaging". In addition to messaging, another necessary component of groupware is to be able to design applications using the messaging as an underpinning, or platform, for distributed teams of people separated by time and geography, to accomplish a common project or mission. The typical sales team, consisting of manager, in-house administration, and mobile or roving sales representatives, represent the ideal model for the technology tool of groupware.

One category of software called "contact management software" is designed to allow sales representative to store information about the customer. This information usually centers on details of the customer's organization, professional life, interactions with the sales representative, and is stored in an 'ad hoc' manner. Sales opportunities are the actual situations in which sales representatives are actively selling to customers. With this type of software it is difficult to logically store information about the sales opportunity and the associated sales cycle, and therefore it has limited functionality in assisting the sales representative in the selling process. Contact management software is also limited in its networking capability, making it difficult for a distributed team to share and collaborate effectively.

Another kind of software called "Sales Automation Software" covers a wider range of functionality and usually provides the capability to store information on sales opportunities. At a given point, a good representative may be working on dozens of sales situations, all at various stages of progress. Sales automation software allows these situations to be reported, characterized by percentage chances of success, and prioritized in a number of ways to aid a manager in forecasting, or to aid the sales representative in determining which situation to work on next.

A weakness with most sales automation programs is that they concentrate more on organizing lists of information, rather than defining the process that occurs within the opportunity. They are therefore unable to use the computer's power to proactively assist the sales representative through the period of time in which he or she is actively trying to sell to the customer.

Another major weakness of current sales automation programs is the inadequate way they calculate two important parameters essential to obtaining the full value of the software—probability and priority. Prioritizing a portfolio of fifty to one hundred sales opportunities at different stages of the sales cycle is a challenge for any sales representative. To do it effectively you need not only a computer, but a way to accurately assess the probability and priority that should be assigned to the sales opportunity.

Probability is typically a numerical value in the form of a percentage describing the chances that the sale will be won by the sales representative. One way to get this number is to simply ask the salesperson to enter his gut feel on winning the sale, in terms of a percentage between one and one hundred. This method is notoriously inconsistent between different sales representatives, even with the same representative forecasting different sales situations. As probability is used by the sales manager to forecast future business, the more inaccurate the forecasting method, the more potential harm to the company.

Another method to evaluate probability is to divide the sales cycle into a number of well defined stages, and to "award" the salesperson a certain percentage chance of winning the sale based on which stage they are at in the cycle. This method does not take into account the fact that no one knows half way through a six month sales cycle whether the sale will come to fruition—sometimes budgets get frozen, or needs change. The performance of the salesperson compared with the competition is also ignored in this method. There is no distinction between a good or a bad salesperson at the "demonstration" part of the sales cycle—they are each awarded a sixty percent chance of success, solely because they have reached this part of the sales cycle. This method has the potential to be more inaccurate than the simple process of asking for "gut feel" percentages.

Current methods of prioritizing sales opportunities are also inadequate. Usually the salesperson's current sales situations are listed in the sales automation program in order of probability, with the most probable at the top. This is especially dangerous if the method of determining probability is based on which sales step the salesperson has reached in the sales cycle. This method allocates the highest percentages to the late stages of the sales cycle—therefore the priority list sorted with the high probabilities at the top will drive the salesperson to work only on those situations at the point of closing or finishing. In fact, a salesperson must allocate his work evenly throughout the sales cycle—he cannot expect to win sales that he has neglected in the early stages of development. Current sales automation programs do not go far enough in assisting the sales representative in the sales cycle—the arena where sales skills are used competitively to fight for the sale.

Some sales automation programs do recognize that selling can be described as a process, involving a sequence of well defined steps, and request that the sales representative enter or check off when he moves from one step to another (they are reactive rather than proactive). These programs tend to involve simple rules, such as, "two weeks after sending a quotation, follow-up with a phone call". Simple rules can help remind a sales representative, but in fact, the sales cycle is quite complicated and difficult to represent adequately through the same serial sequence of steps. For example, a typical sales cycle involves a large number of interactions between the sales representative and customer, such as giving quotations and demonstrations. During these interactions, the sales representative is applying his knowledge of the fundamental skills of selling. At the same time, as the sale progresses, the salesperson is developing knowledge from the information gained, and assessing his current performance in order to plan new strategies or change current ones. Also, because the selling process is highly dependent on human behavioral patterns, no two selling situations are identical.

Thus there is a need to provide an improved method and system of assisting the sales representative in their selling efforts, including a need for a sales automation system that can provide meaningful guidance and coaching to the sales representative during the sales process. There is also a need for a model that describes the sales process in a way that it can be stored in a computer system for providing feedback to the user. Further, there is a need for an improved method to grade sales opportunities according to the probability that the sale will be won by the sales representative. Ideally, such a method should use a minimum of data input and so as to provide consistency across a large sales team and amongst multiple sales opportunities belonging to the same salesperson. It is also desirable to provide a method of prioritizing a list of sales opportunities where a salesperson has the confidence to work from the top to the bottom of the list, knowing that he is optimally spreading his efforts to effectively cover the sales cycles from start to finish.

SUMMARY OF THE INVENTION

According to one aspect of the present invention there is provided a computer implemented method of assisting a sales representative with prioritizing a plurality of sales opportunities. The method includes steps of: for each of the sales opportunities, determining a probability from a finite number of possible probability values that the sales representative will ultimately win the sale; establishing a sales cycle time line for each of the sales opportunities and dividing each of the respective sales cycle time lines into a uniform number and type of selling phases; for each sales opportunity, assigning a time-dependent priority value based on the determined probability values for the sales opportunity and the selling phase that the sales opportunity is in at the time that the priority value is assigned; and providing on a visual display for the sale representative an indication of the time-dependent priority value assigned to at least one of the sales opportunities.

According to another aspect of the invention, there is provided a computer implemented method of providing feedback to a sales representative for a sales opportunity to a customer that includes: determining, in dependence on information received from the sales representative, a probability that the sales opportunity will result in a sale by the sales representative; determining, in dependence on information received from the sales representative, a location on a sales cycle time line for the sales opportunity; assigning a priority to the sales opportunity in dependence on the location on the sales cycle time line and the probability that the sales opportunity will result in a sale; and rendering on a display a visual representation of the probability and the priority.

According to still a further aspect of the inventions, there is provided a computerized sales advisor system for advising a sales representative about a sales opportunity to a customer, the system comprising: an input device for receiving information relating to an actual sales opportunity; an information storage device for storing information, including inputted information; a processor for reading and processing input from the input device and information from the storage device in accordance with a program of instructions to produce an output response; and a visual output device for presenting the output response to the sales representative. The processor is configured for: determining, in dependence on information received from the sales representative, a probability that the sales opportunity will result in a sale by the sales representative; determining, in dependence on information received from the sales representative, a current location on a sales cycle time line for the sales opportunity; assigning a priority to the sales opportunity in dependence on the current location on the sales cycle time line and the probability that the sales opportunity will result in a sale; and rendering on a display of the output device a visual representation of the probability and the priority.

BRIEF DESCRIPTION OF THE DRAWINGS

The invention will be better understood with reference to the following description of the preferred embodiment and drawings in which:

FIG. 6a is a representation of a 3×3 probability matrix;

FIG. 6b is a chart summarizing the information contained in the probability matrix of FIG. 6a;

FIG. 6c is an alternative representation of the probability matrix of FIG. 6a in which probability percentages are shown in place of the probability indices;

FIG. 9 is a chart summarizing exemplary messages and priority rankings which can be assigned to each probability index value in each of the probe, prove and close phases;

FIG. 12 illustrates a data entry screen which is used by a sales representative to determine the beginning and end of a sales cycle;

FIG. 14 illustrates a further data entry screen used by a sales representative to record details of a customer interaction;

FIGS. 17a-17c show additional data entry screens used to enter information during each phase of the sales cycle (FIG. 17a—probe; FIG. 17b—prove; FIG. 17c—close);

FIGS. 19a-19b show a table of possible advisor messages provided during the intelligent response mode of operation;

FIG. 20a-20i show diagrammatic representation of additional possible advisor messages provided during the intelligent response mode of operation.

DETAILED DESCRIPTION OF THE PREFERRED EMBODIMENT

The present method is especially suited to be implemented by software loaded on a computer to produce a computerized sales automation system. Preferably, all members of a sales team, from the field sales representative, his or her support colleagues and sales management will have a computer networked to a system that allows information sharing.

Figure 1:
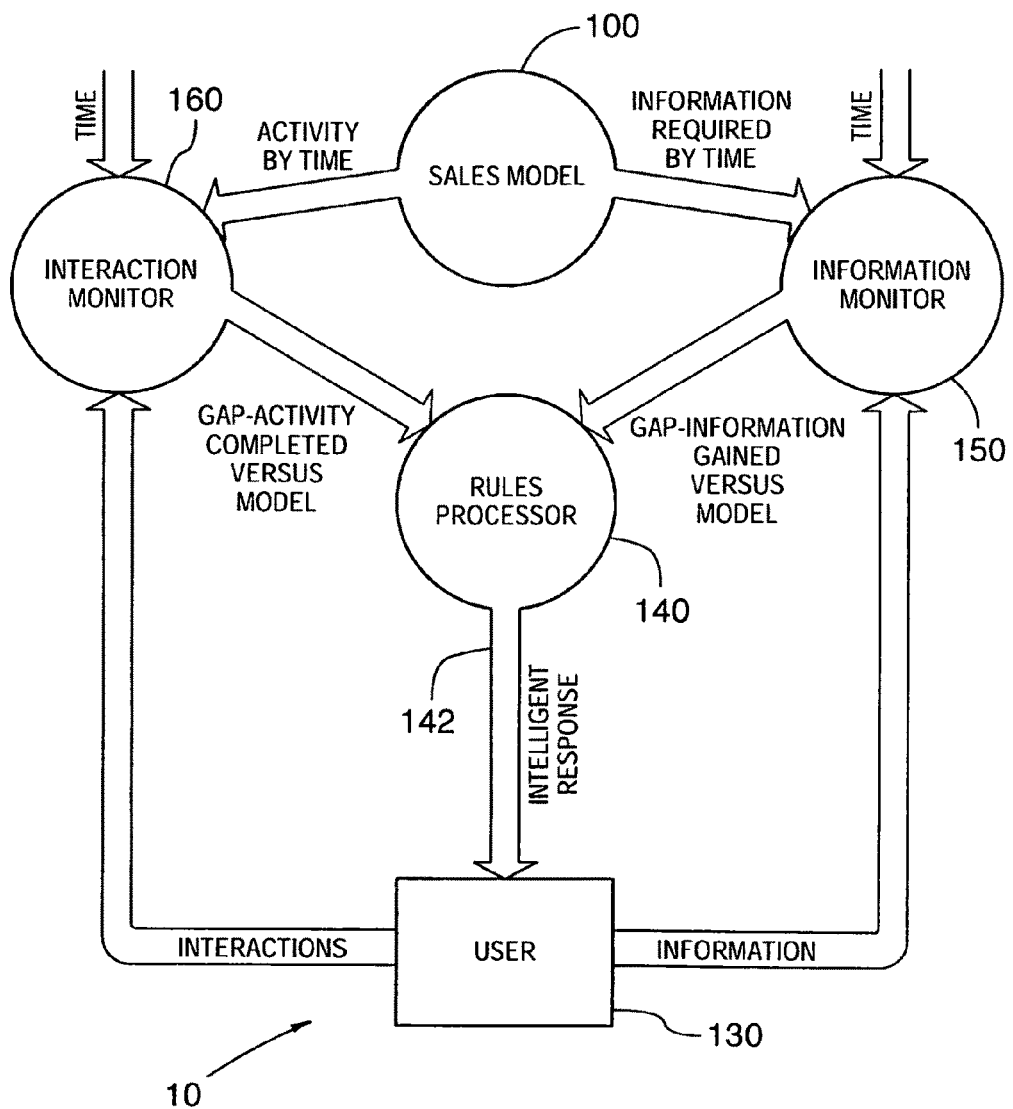
FIG. 1 is a conceptual diagram of various components of a sales automation system according to embodiments of the present invention.

A simplified block diagram illustrating conceptual components of a sales automation system 10 according to preferred embodiments of the invention is shown in FIG. 1. The system 10 includes a user interface 130 that allows a user (typically a sales representative) to enter information into and receive information from the system.

The system further includes a sales model module 100, a rules processor 140, an interaction monitor 160, and an information monitor 150. The sales model module is configured to provide and store, with input from a sales manager, a sales model of the typical sales cycle for the product or service being marketed, and also to track, with input from the sales rep, the actual sales cycle as it happens. The interaction monitor 160 takes information from the user, through the user interface 130, on type and number of critical interactions which occur as the sales cycle progresses, and compares this information with what should have happened, as defined in the sales model. The information monitor 150 acts in a similar manner as the interaction monitor, in that it accepts information from the sales representative and compares the amount and quality of information input by the sales representative with the sales model. The results of the comparisons that are performed by the interaction monitor 160 and the information monitor 150 are passed to the rules processor, 140 which determines a response according to the information received. In a preferred embodiment, the rules processor applies a preprogrammed set of criteria to determine the nature and type of an intelligent response with the objective of providing the user (if necessary) with suggestions on how they should adapt their selling strategies to minimize any gap between real life performance, and performance as represented by the sales model.

The sales model module 100 provides a model that describes the typical sales cycle. The model encompasses all aspects of the sales cycle including events and interactions that occur within in it. The model is constructed such that it may be easily stored in a computer.

According to the present invention, during the sales process, the sales representative enters information into the computer. This process of data entry is preferably designed to reduce administrative overhead to the user; there is a minimum requirement for typing and most information can be gathered through the use of preprogrammed pick-lists. The information on what is really happening in the sale is compared by the computer to model information relating to the model sales opportunity, as stored in the computer. The difference, or "gap", between the two is processed through a set of rules to derive an intelligent response to the user. The response is derived to modify the user's selling strategy in order to minimize the gap as future activity information is entered into the computer.

Figure 2:
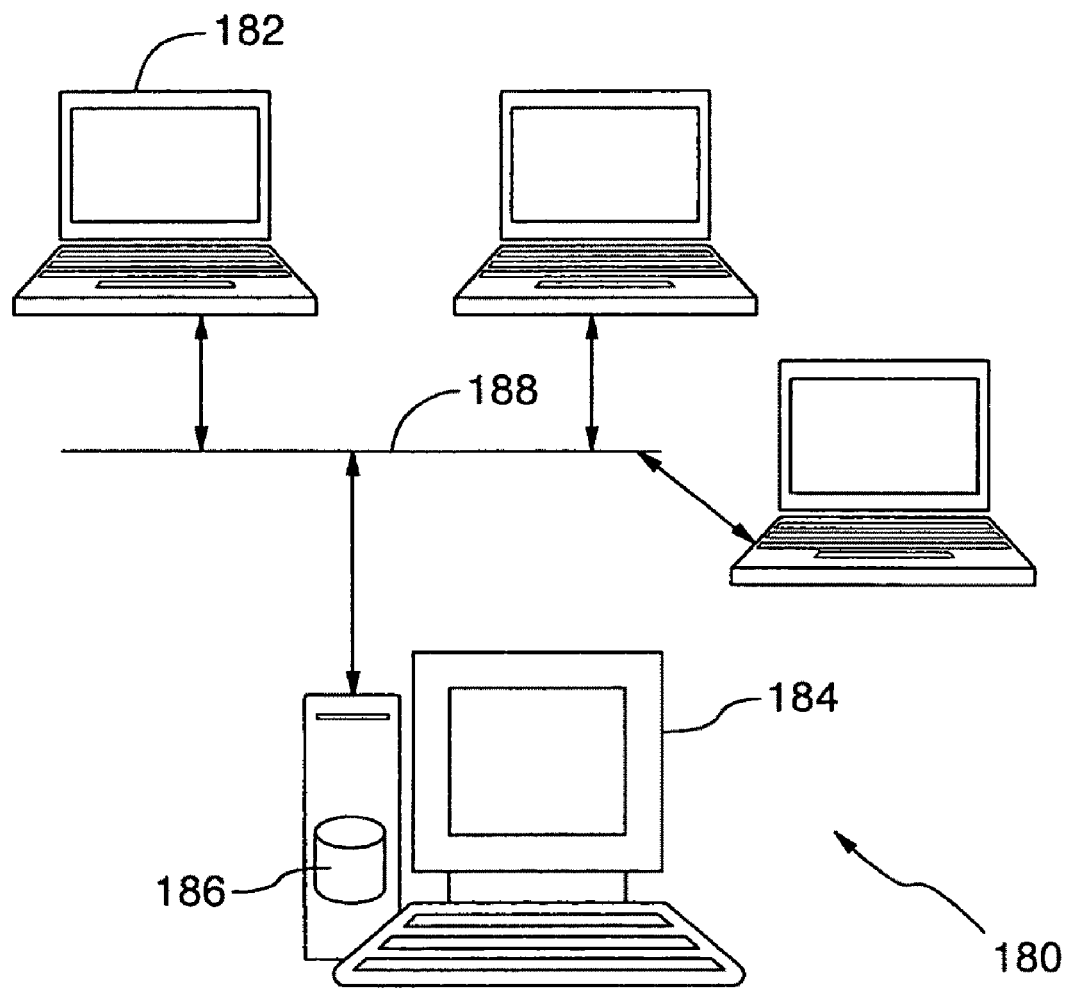
FIG. 2 is a block diagram of a networked client-server computer system on which the present invention can be implemented.

The present invention produces most benefits as a tool for the sales team when it is implemented in a networked computer system 180 (see FIG. 2). Client-server computer architectures are ideally suited to this type of application. The embodiment described here uses the groupware product, Lotus Notes, although other technologies that encourage collaborative networked work processes could also be used. A main database 186 containing all critical interactions between sales people and customers is stored on a central server computer 184. All users can access portions of the database pertinent to their specific responsibilities. The information can either be used directly over the network 188, or can be downloaded to a remote computer 182 through a process called "replication". After replicating, the remote computer 182 can be disconnected from the network, and the user can add or edit data. Changes will later be synchronized with the main database, during the next replication. If two parties have made changes to the same piece of information, replication conflicts are marked. The net effect of the replication process is to maintain a synchronized central database of information, gathered by a team who may be distributed in geography and time.

In a preferred embodiment of the invention, intelligent agents are used to process large amounts of information according to a prescribed set of rules. These agents are small pieces of computer code, or macros, that operate on the server computer 184 at predetermined intervals and during periods when there is inactivity on the network (i.e. at night). They are necessary to perform the essential requisite of the described methodology; that is, to compare actual events and activities against a model describing what should be happening.

An overview of the invention having been provided above, the various conceptual components and their interaction will now be described in greater detail.

The Sales Model

The sales model provided by module 100 describes what happens in a sales cycle in a way that can be successfully modeled in a computer based sales automation system. A sales opportunity is a real situation where the sales representative has identified that he has a strong possibility of selling his product. The customer's sales cycle is defined herein to mean the time period from the point that a customer initiates the buying process to the point when he makes his final decision to buy from a selected vendor. The sales opportunity always has an associated customer's sales cycle and is therefore the time over which the sales opportunity takes to mature and come to completion. The customer's sales cycle is also the time during which the sales representative has the chance to show how successful he is at using his selling skills.

During the customer's sales cycle numerous interactions occur between the sales representative and the customer as part of the selling process. A large component of the selling process is dependent on human interactions, which is difficult to model in the computer. This component can be referred to as "the art of selling". There is another component of selling, however, that is dependent on well-established techniques and rules that have been developed and proven over many years, which can be referred to as "the science of selling". The sales model used in the present invention models the selling process using principles more properly characterized as belonging to the science of selling.

The sales model is a "picture" of all the important interactions and events that occur throughout the sales cycle, and which describe the sales process. The model is constructed using four key aspects which describe the sales cycle and processes occurring within it. These four aspects are:

1. Time

The essence of the sales cycle model resides in the exact description of the sales cycle itself—the sales cycle has a beginning and an end, and therefore has a certain duration of time. The beginning of the sales cycle is defined as the point of time when the customer starts the buying process. While this point cannot be defined exactly, certain customer actions are usually good indicators that the process is commencing. Such actions include, for instance, applying for a budget for the product or service, or gathering information about the available options. Salespeople should always be vigilant about identifying the point that the customer starts the buying process—this gives them more time to sell, and therefore a better chance to win. This invention reinforces this philosophy and therefore contributes to higher sales.

The end of the sales cycle comes when the customer makes a final decision to give his business to a selected vendor. This point is easier to ascertain than the beginning of the sales cycle. The challenge though, is for the salesperson to forecast this date—in other words to forecast the length of the sales cycle. The sales rep must estimate the sales cycle end date and enter it into the computer at the start of the safe, and update the estimate throughout the sales cycle as the dynamics of the sale change. Again, indicators from the customer are needed to assess the end date. The customer can be asked directly, "when would you like the product delivered?". If the answer is unclear or imprecise the salesperson should make his best estimate and refine it as the sale progresses.

Figure 3A:
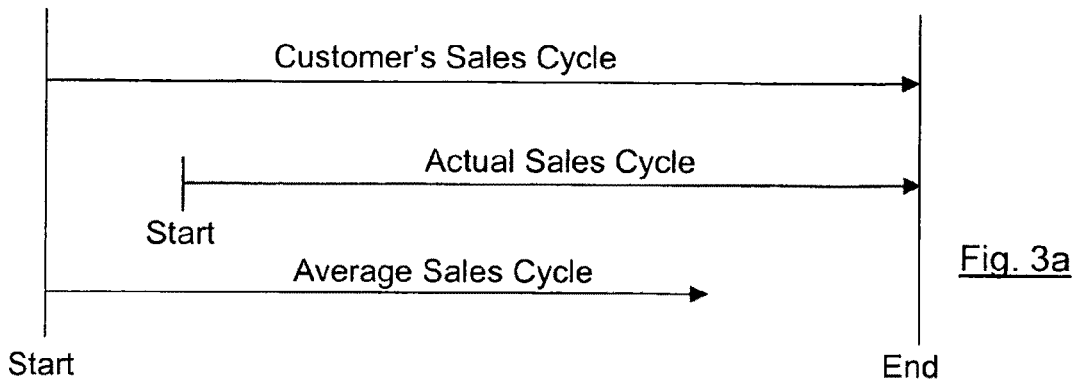
FIG. 3a is a simple diagram comparing actual, customer's and ideal sales cycles.

For a given product or service there is defined an ideal sales cycle. This can be established by reviewing data on a large number of past sales and using past experience to determine how long it should take to win the sale in the ideal world. Ideal sales cycles vary considerably according to product and industry sector. There will also inevitably be "actual" sales cycles that are shorter or longer than the ideal for a given product. An example of a short actual sales cycle is a situation where the sales representative has discovered the sales opportunity late, that is, after the customer has commenced the buying process. An example of a long actual sales cycle is a situation where the sales representative has discovered the sales opportunity very early on in the customer's buying process. FIG. 3a shows examples of the customer's sales cycle, a short actual sales cycle and the ideal sales cycle.

In a preferred embodiment, the sales model is applied to the actual sales cycle, which is defined herein to mean the sales cycle measured from the point of time that the sales representative first learns that the customer has started the buying process. If the opportunity is discovered very late in the cycle, then the sales representative must obviously make up for lost time. All aspects of the model are scaled in time according to the actual sales cycle, even though the model has been set up for the ideal sales cycle.

Time is an important parameter of the model, as each event, interaction, and piece of information is identified relative to when it happened in the sales cycle, and compared to when it should have happened, if it is time sensitive information.

2. Sales Skills

The sales model defines three fundamental sales skills—probing, proving, and closing. The sales cycle is divided into three consecutive time phases named probe, prove, and close, after the sales skill most dominant in that phase. These sales skills are described as follows:

Probing: the process where the sales representative finds out the details of the customer's requirements and needs. Also, the whole background of the sale is established, for example—"Who are the decision-makers?", "Who are the competitors?", "Does the customer have sufficient funds to buy the product?". In the sales model of the present invention, probing is the dominant skill used in a first phase —the probe phase.

Proving: the process whereby a sales representative demonstrates to the customer how the features of his product or service can satisfy their requirements. This process usually involves a demonstration of the product itself. Proving, is dominant during phase two of the sales cycle—the prove phase.

Closing: the process of establishing if the customer has enough information to make a purchase and if there are any reasons why the customer feels they should not buy the product or service. Customer objections must be drawn out and addressed by the sales representative. The goal in closing is to obtain a customer commitment, once all issues have been addressed successfully. Closing can only proceed when the customer has learned enough about the sales representative's product or service in order to make an intelligent decision. Closing is the dominant skill in phase three of the sales cycle—the close phase.

Figure 3B:
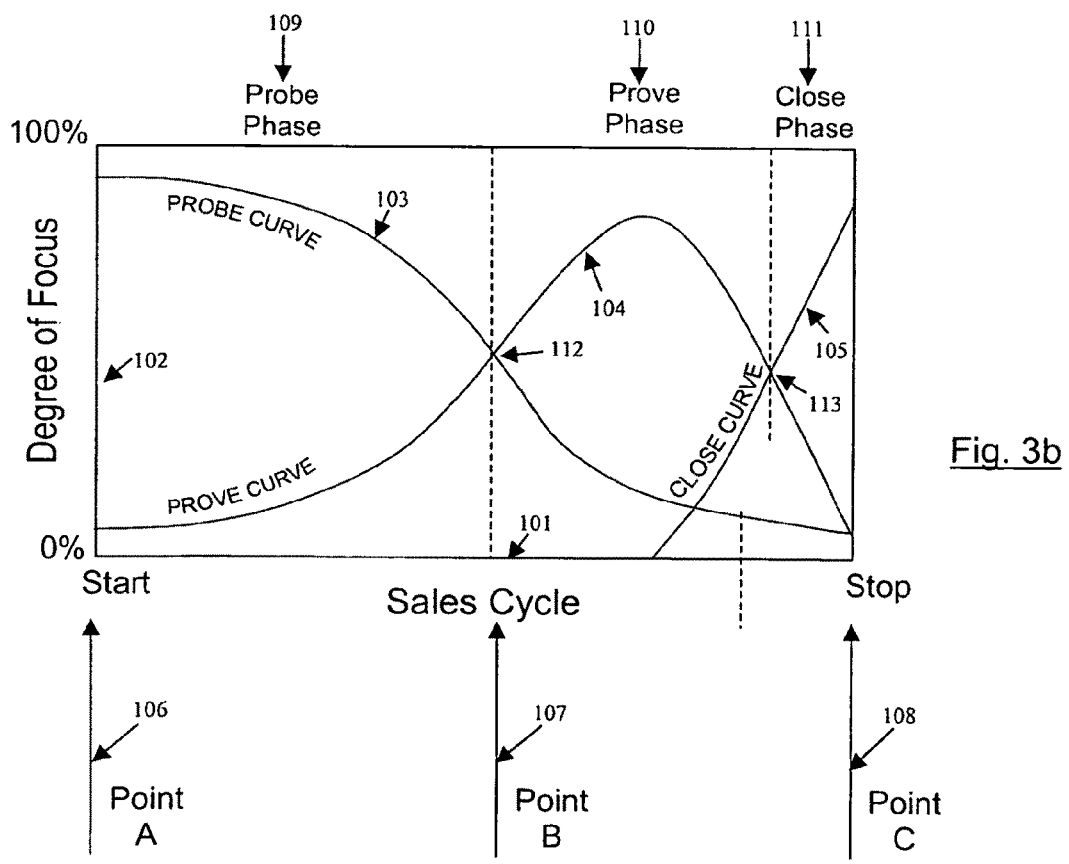
FIG. 3b is a graphical representation of a "degree of focus" or emphasis placed on the fundamental sales skills of probing, proving, and closing as a function of time during a sales cycle.

FIG. 3b shows a diagrammatic representation of the three-phase sales cycle according to the present inventive model. The sales cycle is represented by the horizontal axis, 101, in units of time. The vertical axis, 102, represents the degree to which the sales representative is using the sales skill of probing, proving or closing. This axis is labeled "Degree of Focus" and has values from zero to one hundred percent. The model shows how the use of probing varies as a function of time by the probe curve 103. Similarly, with the proving process, curve 104 shows how this skill is used over time throughout the sales cycle. Curve 105 shows how the use of the closing skill is used in the sales cycle.

According to the present model, at any given point in the sales cycle, the three degrees of focus on proving, probing, and closing must sum to 100%. For example, at point A in FIG. 13, 106, the degree of focus on probing and proving is 95% and 5% respectively. At point B, 107, the degree of focus on probing is 50% and that of proving, is also 50%. At point C, 108, the degree of focus on probing, proving and closing is 5%, 5%, and 90% respectively. Although the model in FIG. 3b is shown as quantitative, this is not crucial to the success of its implementation. What is important is the overall shape of each probe, prove, and close curve, and their rough relative values at a particular point in time within the sales cycle.

The probe, prove, and close curves represent how much each of these skills should be used throughout the sales process within the sales cycle. The model provides that in the early stages, probing is the dominant process, in the middle stages proving is the dominant process, and in the later stages closing is the dominant process. An important feature of the present model is that it allows for the three fundamental skills to occur within the same interaction. The phase of the sales cycle in which a particular skill is dominant is labeled with the name of that skill. Therefore, the probe skill is dominant through the probe phase, which is represented by 109 in FIG. 3b. The prove skill is dominant through the prove phase, which is represented by 110 in FIG. 3b. Closing is the predominant skill in the close phase, which is represented by 111 in FIG. 3b.

The transition point between the probe and the prove phase is the point at which the prove curve goes above the probe curve, as shown at point 112 in FIG. 3b. The transition point between the prove and close phase is the point at which the close curve goes above the prove curve, as shown at point 113 in FIG. 3b.

Shapes of the curves are determined by the following principles. At the beginning of the sales cycle it is assumed that the least amount of information is available regarding all aspects of the customer's needs and the environment surrounding the potential sale. The sales representative must obtain as much detail as possible regarding these factors, using the skill of probing. Therefore, probing skills are used with maximum focus at the beginning of the sales cycle. As information is collected and evaluated the process of proving can begin. As probing is completed (i.e. as one moves further through the probe phase), the focus on proving can increase because we know more about the specific needs of the customer. Proving skills can then be increasingly used at the same rate that the skill of probing is decreasing. The degree of focus on probing will continue to decrease throughout the sales cycle as more information concerning the sales environment is collected, until the end of the sales cycle, when the use of probing will be proportionately low.

Use of the proving skill will continue to increase through the sales cycle until the customer has been exposed to virtually all features and benefits of the product. This maximum focus on using the proving skill will occur in the later stages of the sales cycle. Often, proving will peak at the point where a demonstration of the product takes place. From this maximum focus the use of the proving skill decreases, until it reaches a minimum at the end of the sales cycle.

The skill of closing entails determining whether the customer has any reservations about giving their business to the sales representative. Probing techniques must also be used to make these determinations. As FIG. 3b shows, the model allows for a degree of probing to be used throughout the entire sales cycle. As customer doubts are discovered through the probing process, then proving must be used to allay them. As the process of closing intensifies we can see that probing and proving skills must be brought into play, but to a lesser and lesser degree with the sales cycle nearing an end. As the process of closing continues, the proving and probing processes will decrease.

In summary, the probe curve starts at a maximum at the beginning of the sales cycle and falls off to a minimum at the conclusion. The prove curve is at a low point at the start of the sales cycle and reaches a maximum in the later stages. From there the prove curve falls to another minimum at the end of the sales cycle. The process of closing cannot start until the customer has been fully exposed to the benefits of the product (the proving process has reached its maximum); it then increases in focus until the sale is finalized.

The relative lengths of the three phases can change, but typically the probe phase is longest, followed by a shorter prove phase and an even shorter close phase. Usually, the close phase is no more than 10 to 20 percent of the total cycle. Proving should not be used too early before considerable probing has been accomplished. Also, it is not a good idea to start closing too early. The ideal sales cycle is divided approximately into 50 percent probe, 35 percent prove, and 15 percent close. A beneficial feature of implementing the model of the present invention is that it can be used to keep the sales representative on track with respect to the three basic skills. The salesperson should be reminded if they are tempted to move too quickly from one phase to another, or to use a specific technique excessively at a point in the sales cycle where it is highly inappropriate. Aspects of the present invention, as embodied in a computer based sales automation system, provide such advice to the salesperson.

Figure 4A:
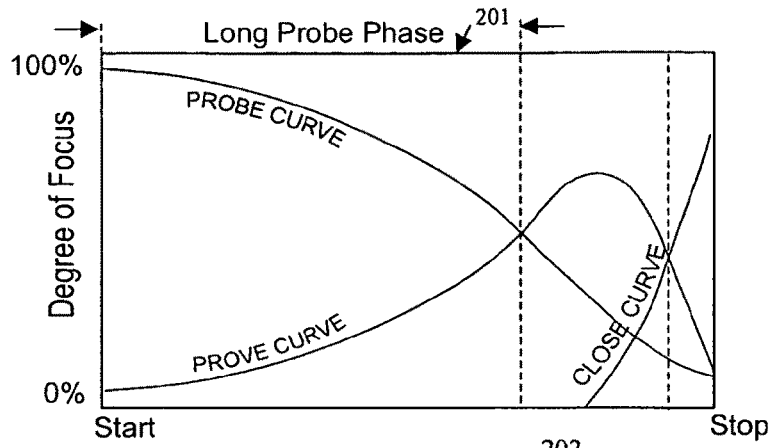
FIGS. 4a-c are graphical representations similar to that of FIG. 3b further showing how the relative lengths of the phases in which the probing, proving, and closing skills respectively predominate can be different for different sales situations.
Figure 4B:
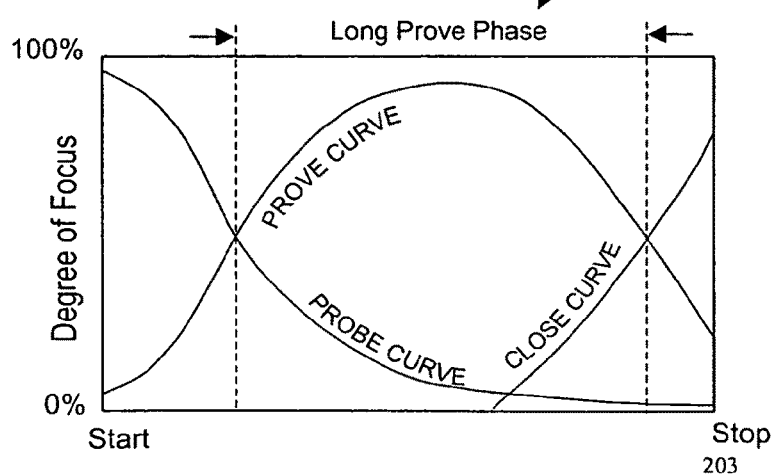
Figure 4C:
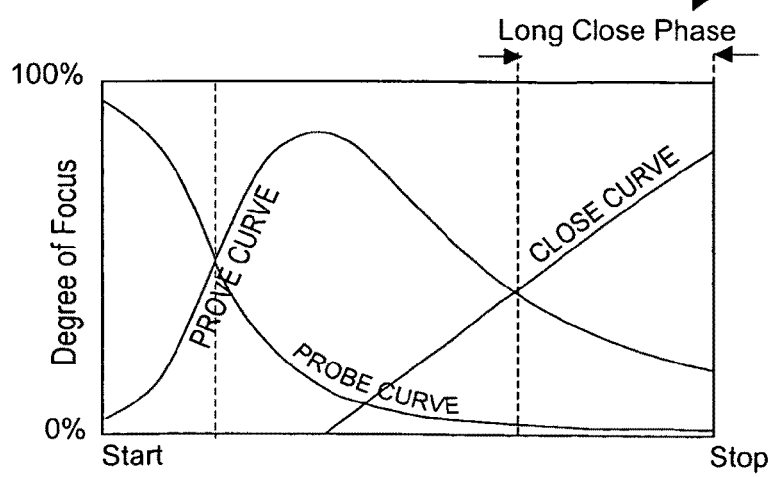

FIGS. 4a-4c shows three examples of sales cycles which have the same cycle length, but different relative lengths of probe, prove, and close phases. FIG. 4a shows a sales cycle with a long probe phase 201. This situation can occur if a customer is unsure of exactly what he needs to fill his requirement—that is, there may be numerous alternative solutions, and proving cannot begin until a specific solution is identified. FIG. 4b shows a sales cycle with an overly long prove phase, 202. This kind of situation can occur if a very complex solution has to be proven to the customer, which may need extra time and resources compared to normal products. FIG. 4c shows a sales cycle with a long close phase, 203. This usually happens when a customer finds it difficult to make a decision. All of the evidence has been presented, and the product has been proven, but the customer is afraid, procrastinating, or having trouble deciding on a specific vendor.

It is important to note that deviations from the ideal situation can, and do, occur, as described by the model. However, the model is flexible enough to be able to identify and accommodate the abnormalities, and can be implemented so as to warn the sales representative when appropriate action may have to be taken.

3. Interactions

Throughout the sales cycle, interactions occur between the sales representative and the customer. Some interactions involve direct verbal communication in a face-to-face environment, while others such as faxes, e-mails, letters, etc., involve a "one way" communication, where it is uncertain whether the party to whom the correspondence is directed has necessarily received or reacted to it. The model distinguishes between two types of customer interactions—critical and non-critical. Critical interactions are those that contribute to the overall knowledge of the specific sales opportunity, and are important in determining the best sales strategy for that opportunity. This information may be positive or negative with respect to the sales representative's case, but even negative information is useful in understanding the overall background or environment of the sale and adapting strategies to compensate. Non-critical interactions are not specific to any sales opportunity. They may be casual or unimportant but still be deemed worth recording by the sales representative. In this case, the sales automation system described here offers the ability to store and retrieve this information if required, but also separates them from the strategically important critical interactions.

Figure 5:
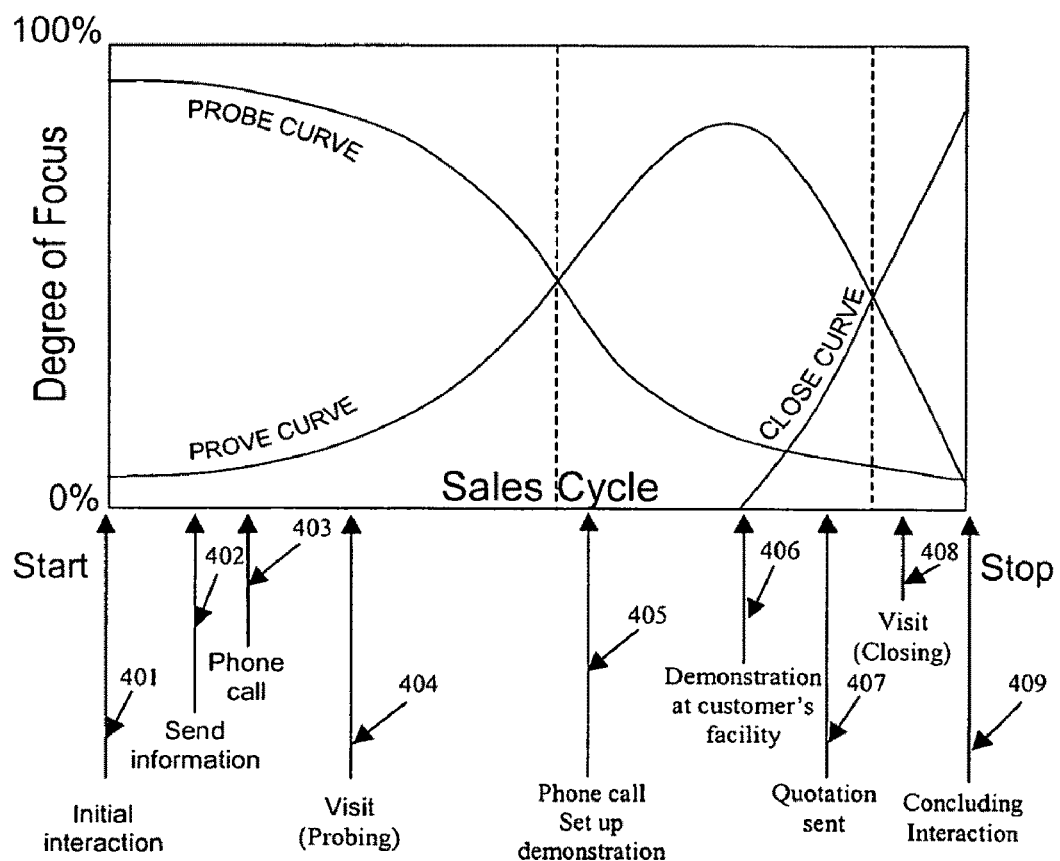
FIG. 5 is a graphical representation similar to that of FIG. 1b further illustrating examples of critical interactions (i.e. activities) that can occur through a typical sales cycle and the time of such interactions within the sales cycle.

In any given sales cycle, the model says that a certain number and type of critical customer interactions should occur. Also, the model specifies roughly when these interactions should occur, in which phase, and which point in that phase. This information can be determined using past experience and expert knowledge and is entered in advance for a particular sales opportunity by, for example, the sales manager. For example, FIG. 5 shows a model sales cycle for a small piece of laboratory equipment that has a value of around five thousand dollars and an average sales cycle length of three months. The sales manager has elected to allocate the critical customer interactions as follows:

The first interaction is the one that led to the discovery of the sales situation (401). This always involves a direct verbal interaction with the customer. The only exception to this would be in the event that the sales representative learned of the situation through a source other than the customer—but in this case, the representative should always check directly with the customer to confirm the information.

Next, the customer is sent a complete information package on the product (402). This should occur soon after the initial interaction.

The sales representative then makes a telephone call (403) to the customer to establish that product information has been received, and also to probe on which specific product best fits the customer's needs. This call is made in the early stages of the probe phase.

The next interaction that the sales manager has entered into the model is a visit by the sales representative to the customer (404). This occurs in the later stages of the probe phase.

A phone call is then made to the customer to set up a time to demonstrate the product (405). This happens in the early stages of the prove phase.

Next comes a demonstration of the product at the customer's facility (406). This of course, again involves a direct face to face meeting of the sales representative and the customer.

Shortly after the demonstration, a quotation is sent to the customer (407).

After the close phase has begun, another visit is made to the customer (408).

The final customer interaction occurs when the customer tells the sales representative whether or not they have chosen to purchase the product (409).

The sales manager can set up the customer interactions in a number of different ways: however, based on knowledge derived from many similar situations, it can be gauged fairly accurately how many, and what type of, customer interactions should occur. In order for the model to be effective when embodied in a computerized sales automation system the number and type of interactions is not critically important. The sales manager can lean toward a model with a bare minimum of customer interactions and assume that this will then ensure that the sales representative is flagged whenever his activity is less than the defined minimum. Conversely, the model can be set to reflect the exact type of interaction that should occur at specifically defined points in the sales cycle. The sales automation system 10 will then alert the sales representative at any point there is a deviation from what is expected (i.e. the activity has not been completed, or the type of activity is inappropriate). It is important to set up the model to define the "expected" critical interactions that should occur, so the sales representative is made aware when he is, or is not, fulfilling the basic requirements necessary to secure the sale.

4. Information

Throughout the sales cycle, the sales automation program prompts the sales representative to enter information, such as a new activity or customer interaction, into the computer. In a preferred embodiment, required information is categorized as follows:

a. Basic information concerning the sales opportunity, such as who the customer is, account, and type of product, (as with any other high grade sales automation program).

b. The length of the sales cycle, as perceived by the sales representative. The start of the actual sales cycle is the time that the sales representative finds the sales opportunity and enters it into the computer. The computer then prompts the user for the date that he expects the customer will place the order. From these two dates the computer calculates the length of the sales cycle. If the expected completion date changes for any reason, the new completion date should be entered in the program.

c. What kind of interaction has been completed (i.e. visit, phone call, quotation etc.), and when was it completed?

d. What was learned during the customer interaction?

The regular review and analysis of the information gained throughout the sales cycle is critical to the sales representative's overall success. As used herein, "the sales environment" is defined as "all aspects or circumstances surrounding the sales situation that may have an impact on whether the sales representative wins or loses the sale". The model provides a knowledge base, derived from a structured set of questions regarding key aspects of the sales environment. These questions are quite generic to a wide range of industries, but can be completely customized by the sales manager. The information is categorized as two types:

(i) Information required to completely understand the sale—in this invention, the sales environment. The only way to establish whether the sales representative is totally aware of the sales environment is for the sales automation system to routinely and automatically ask questions that should be answered by the salesperson. Aspects of the sales environment are: Who are the decision-makers? Who are the competitors? Has the customer sufficient funds to purchase my product?—and so forth. The automation system 10 prompts for this information by asking specific questions of the sales representative, (i.e., "who are the decision makers and please name them?"). This information is obtained using the skill of probing, which the model allows to occur throughout the entire duration of the sales cycle. Other information that is part of the sales environment is obtained using the proving and closing skills. The quantity and quality of information gained is an indicator of the success of proving.

(ii) Information required to assess one's progress in the sale. This assessment is obtained by evaluating, "how well am I doing at this point in the sales cycle?" This can be answered by asking, "how well am I proving, and how well am I closing" The sales automation system obtains this assessment by posing questions such as, "to what degree have you proved the value of your product to decision maker number 3?" or "have you made a trial close at this point in the close phase?". The answer to this type of question is solicited from the user by asking them to choose, for instance, from one to five possibilities, ranging from "not at all" to "completely". Input is requested regarding the sales representative's assessment of the probability of winning this sale. This assessment must be made when first entering the opportunity, though it is normal for the assessed probability to change a number of times during the sales cycle. Again, the sales representative should be aware of this eventuality and must record any changes in the sales automation program to reflect the new situation.

In preferred embodiments, the sales automation system enables comparison of the information entered by the sales representative to that which is stored in the sales model. With reference to FIG. 1, the user enters, via user interface 130 information starting at the beginning of the sales cycle, when the sales opportunity has been discovered, and continuing throughout the sales cycle, as subsequent interactions with the customer occur. The sales model is stored by sales model module 100, and has been configured with the four components of time, selling skill, activity, and information for the product or service the salesperson is selling. Any deviation occurring at any point in the sales cycle between the information entered by the salesperson and that which is contained in the model, is called a "gap". The interaction monitor 160 compares actual interaction activity that has been entered as completed by a certain time in the actual sales cycle with the interaction activity that should have been completed by that time according to the sales model The information monitor 150 compares the actual information entered as gained at a certain time in the actual sales cycle with data in the sales model (a simple example would be if the sales representative entered an opportunity for a certain product and estimated the sales cycle length to be six months, while the average sales cycle was stored in the model as nine months, thereby creating a gap of three months).

The gap information is passed to a rules processor 140 which is programmed to pass an intelligent response 142 to the user based on this information. In the above case the intelligent response may be, "you have entered a six month sales cycle, the average is nine—you are late into this sale and have some catch up work to do". Another intelligent response would ask the sales representative to check the expected date for the sale, in the event that a data entry mistake had been made.

Another example of the intelligent response would be if one third of the way through the sales cycle four customer interactions have occurred and recorded in the computer by the sales representative. The sales model indicates that at such point in the sales cycle six interactions should have occurred. The gap is two interactions that have not occurred. The rules processor 140 processes the gap information and feeds a message (i.e. "at this point you need to try to make two more customer interactions") back to the user (sales representative). The response can also be dependent on what the current phase of the sales cycle is, and how much information has been collected. For instance, the response to the salesperson can be as encompassing as, "you are half way through the probe phase but have not yet identified the decision makers—your customer interactions are fewer than would be expected at this time—it is time to see the customer".

A further example is the situation where a sales representative, at the end of the probe phase, should have entered the answers to six questions concerning the sale, but in fact has only answered two of the six. The gap is four questions not answered. The rules processor could be programmed to pass an intelligent response to the user suggesting that the four questions have to be answered before the sales representative is "allowed" to pass to the prove phase. This advice could also be forwarded automatically to the representative's manager. There are many possibilities for the types of responses that can be initiated by the rules processor, given the circumstances in which the gap information is generated. In general, the intelligent response is constructed to advise the salesperson to modify activities or information gathering so the net effect is to minimize the gap.

There are many different ways of presenting intelligent response information to the user. The most direct way is to present the intelligent response on the screen of the salesperson's computer 182, immediately after the salesperson has entered information from customer interactions associated with an existing opportunity. This kind of response occurs in real time, the only delay being the time the computer needs to calculate and present the response to the user.

Another way is through routine summary reports, which can be sent to the sales representative automatically via e-mail by the sales assistance program. These reports, unlike the direct method of presenting information on one opportunity in real time on the computer screen, gather summary information on all of the opportunities that the sales representative may be working on at any given point of time.

Assigning Probabilities

In preferred embodiments of the invention, the automation system 10 is configured to generate, based on user inputted information, a probability indicator for sales opportunities. For every sales opportunity there is a certain probability that the sales representative will be successful in winning the sale over the competition. It is, for a number of reasons, extremely important to try to quantify this probability of success—the most important one being the ability to forecast accurately. A company needs to continually plan for the future, and a vital part of this plan is an assessment of the revenue that will be generated by the sales team in the future.

It is important that the sales representative determines the chances of success, not only upon initial discovery of the sales opportunity, but also throughout the sales cycle, as the sale progresses. This exercise is necessary because the dynamics of a sale shift constantly throughout sales cycle. This means that the total forecasted company revenue is also constantly changing. Therefore, the salesperson should regard assigning probabilities to his opportunities very seriously, and should update this information anytime that a significant change occurs in the sales cycle.

There is another important reason to review opportunities regularly on the issue of probabilities. This process will focus the salesperson to critically evaluate each situation and the issues surrounding the sale, and will trigger changes in strategies if needed, to improve the chance of success.

The sales representative also needs to prioritize opportunities under his responsibility so as to answer the question, "where shall I best spend my time?". This is not an easy task, and many factors must be taken into consideration. The probability of the sale happening is the most important component in determining where the representative should best use their most important resource. As will be explained in greater detail below, the sales automation system 10 of the present invention integrates the assessed probability with the skill phase (i.e. probe, prove or close of the sales cycle at that time) and enables the computer to assign a priority to the opportunity.

Obviously, determining the probability of success in a sale is not an exact science—in fact, it is one of the most difficult parameters to quantify. It also creates work for the person in charge of filtering monthly forecasts from the sales force—sales people differ tremendously in the way they forecast. Forecasting always brings out the pessimistic or optimistic side of our nature, and it is therefore quite possible for two excellent sales professionals to be at opposite ends of the spectrum. It is a challenge to the sales automation system to provide a method of deriving probabilities that eliminates such deviations from one salesperson to another.

Most sales automation systems merely ask the question "what percentage probability is there that we will get this sale—answer between zero and one hundred percent". It will be appreciated that answers to this question such as 37%, 45% or 65% rarely have the exactness that they seem to imply. The most that can be said is that the 37% and the 45% values may likely mean the same thing, as may the values of 45% and 65%. However the values of 37% and 65% probably reflect a different probability of success. In other words, in the complex sales process it is impossible to forecast to this level of certainty. Experience shows that asking for assessments categorized to increments greater than six is often pointless.

The present invention relies on the salesperson's ability to judge aspects of the sale that determine the probability of winning the sale. The objective is to ask for his or her "gut feel" about whether the sale will be won or not. Although a numerical value of the probability is desired, under the present invention the salesperson is not directly asked for the number, because it will not be consistent or accurate. Part of the solution lies in asking the salesperson easy, but penetrating, questions about crucial elements of the sale and to limit the number of possible replies. The other part of the solution is to construct the probability value from two totally unrelated questions concerning the sale, preferably questions that need answers in non-numerical terms.

The extremes of assessing probabilities are, "this customer is definitely buying, and is also buying my product", and "he is probably not going to buy anything, and if he does he will definitely buy from the competition". In between we have the challenging situation of, "this customer may buy something and we have an equal chance with the competition that they might buy from us".

The above examples illustrate a possible method to make it easier for the sales representative to approximate the probability of securing the sale. There are two basic questions to consider here; the first being, is the customer going to buy anything at all, even from the competition? A number of factors may determine this, and the sales representative must be prepared to look in detail for any one of them. For example, does the customer have the ability to finance what he wants? How will corporate politics influence the ability to get what he wants? Is this customer being too optimistic that upper management will allow him to go ahead with this project? The sales representative has to be acutely aware of these issues to determine the chances the sale will actually come to fruition. In this case the question asked of the salesperson is, "Will this sale happen?"

Aside from the question of whether the sale will happen, the sales representative has to evaluate the chances that the customer will choose his product over the competition. Factors affecting this decision will be things such as the relationship between the representative and the customer—how effectively is he selling the customer on his product. How effective is the competition. The question asked here is, "Will we get it?"

Probability is determined by the answers to "Will the sale happen?" and if it does, "Will we get it?" If the answer to each question is one of three alternatives—High, Medium, or Low chance, then, as can be seen in FIG. 6a, the possible answers lie on a three by three grid 210, with a total of nine possibilities. This is called the probability matrix. As illustrated in FIG. 6b, each unique point on the matrix represents a unique combination of the answers to the two questions, "Will it happen?" and "Will we get it?", and is called the probability index. In FIG. 6b, the probability indices are labeled from one to nine.

Many sales managers are still, however, accustomed to seeing probabilities expressed as percentages. Percentage values can be assigned to the individual probability indices, as shown in FIG. 6c. This exercise does not have to be executed with mathematical rigor in order to be useful. One method used here is to assume that an answer of High represents a probability value of 80%, Medium is 50%, and Low is 20%. Each point on the matrix is the product of the answers to "Will it happen" and "Will we get it"—High, Medium or Low. Multiplying the probability values and scaling the answers with some approximations results in the five probabilities of 10%, 15%, 25%, 40%, 60%, and 80%.

Determining Priorities

Figure 7:
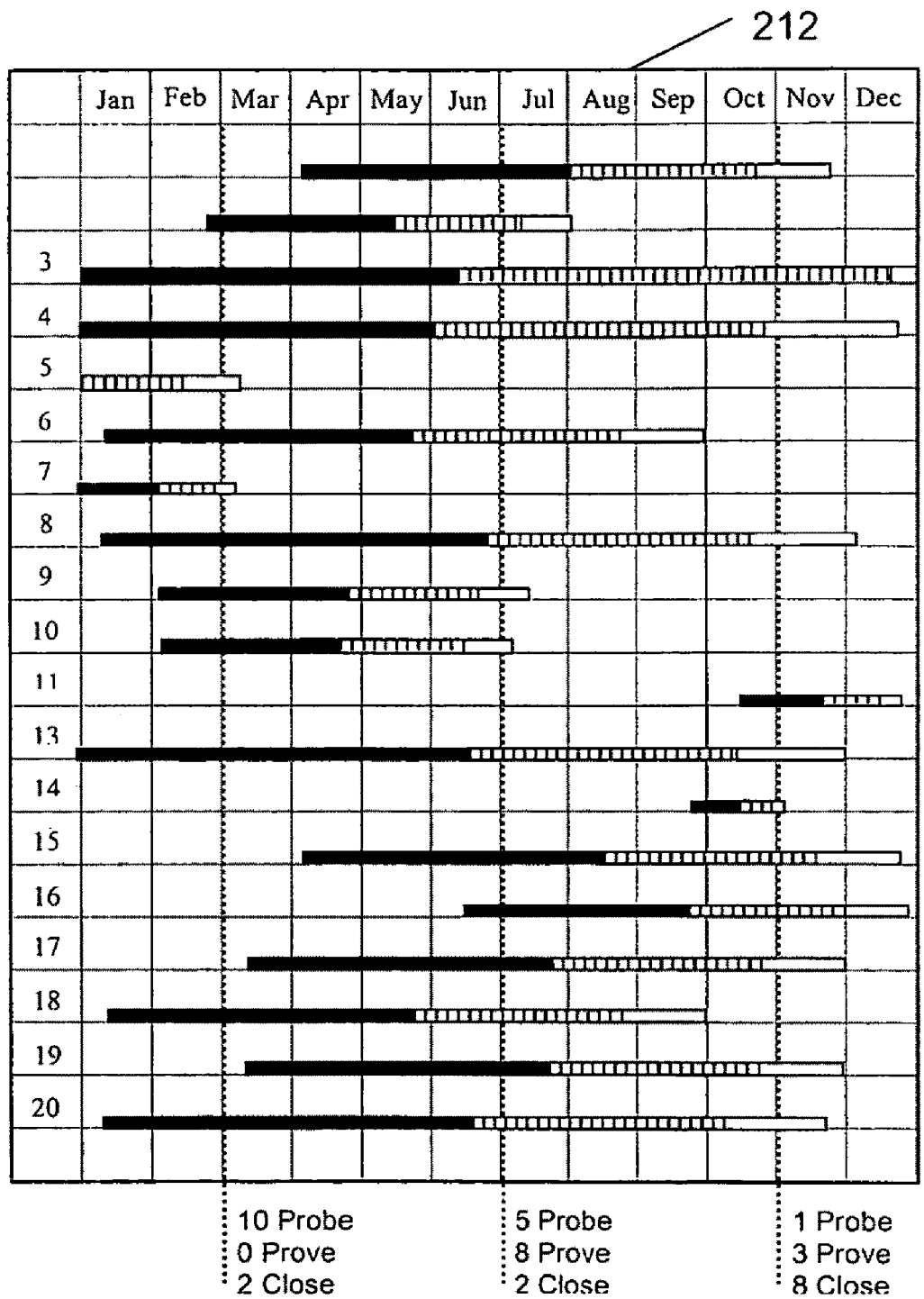
FIG. 7 is an exemplary horizontal bar graph representing the sales cycles associated with twenty sales opportunities occurring over the course of one year.

According to preferred embodiments of the invention, the sales automation system 10 is configured to determine a time-based priority to assign to a sales opportunity by taking into account both the probability that the sale will occur, and the location (time-wise) within the sales cycle for that sales opportunity. At any time, a sales representative may be working on dozens of sales opportunities, varying in sales cycle length, and at different points in their sales cycle. An illustration of this is shown in FIG. 7, which shows a time-line chart 212 of just twenty opportunities occurring over a one year period. The sales cycles range from a few weeks to many months. In the illustrated example, it can be seen that at the beginning of March, the salesperson has ten opportunities in the probe phase, zero in the prove phase, and two in the close phase. At the beginning of July, he has five opportunities in probe, eight in prove, and two in close. At the end of October, he has one opportunity in probe, three in prove and eight in close. Obviously, if the salesperson has one hundred opportunities instead of twenty, it is difficult to decide where to allocate time—considering that each of the skill phases should be given approximately the same attention. A method of determining priorities, is needed which can be used to sort a list of opportunities so that the salesperson can rigorously work through the list from top to bottom, confident that each opportunity is being handled effectively through its entire sales cycle.

Novel aspects of the present invention are directed towards the recognition that the assessed probability of a sale happening should not be the only factor in determining the priority a sales representative should use when working through a set of opportunities. That is the technique that is used in most sales automation systems today, and imposes the danger that the salesperson works only on opportunities that are near the end of the sales cycle, in their close phase. The point of time in the sales cycle should also be taken into consideration. The skill phases provides a way to "normalize" the sales cycles of widely different durations—the skill phases (probe, prove, and close) can be used to provide an extra dimension that works with probability to provide a useful priority value for the opportunity. This concept is illustrated with examples shown in FIGS. 8a and 8b.

Figure 8A:
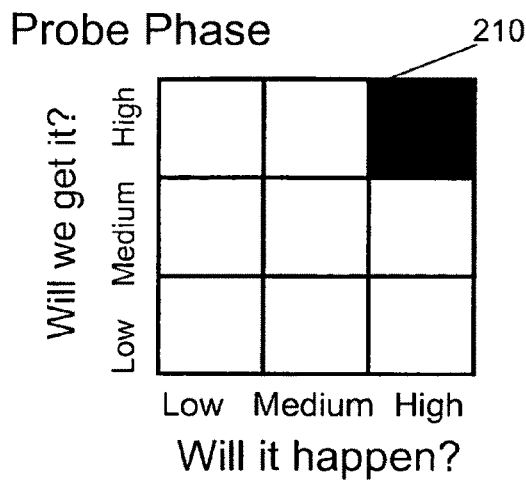
FIG. 8a-b are diagrams showing how different suggestions for action and different priority rankings can be generated depending on the phase of the sales cycle.

FIG. 8a shows a situation where the sales representative has graded an opportunity in the probe phase (the initial stages of the sales cycle). On the probability matrix "Will it happen?" has been assigned high, and "Will we get it?" has also been assigned high. As this is in the early stage of the sales cycle, there is still time until the customer buys something. There is also still a chance that the competition could make a breakthrough in the time left, so the advice to the sales representative by the automation system 10 would be, "you are very confident but don't be too complacent—do enough to protect this sale from falling to the competition". A priority 2 has been assigned—not a priority 1. In other words, as this is early in the sales cycle and the customer is highly favoring the product, the sales representative must be vigilant but does not need to give the opportunity urgent attention.

Figure 8B:
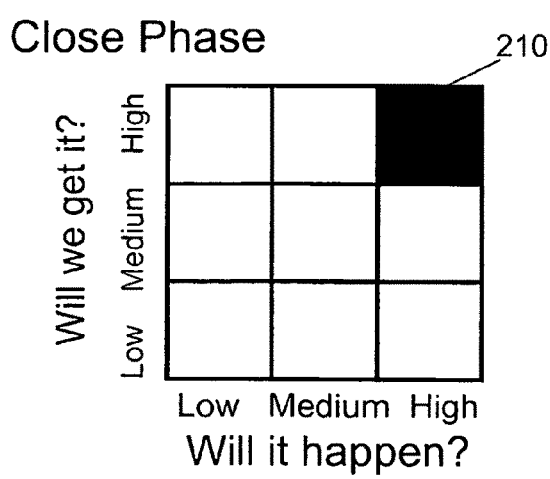

FIG. 8*b* depicts a situation where the same probability has been assessed, now in the close phase. At this point there is little time for the competition to intervene. The message to the sales representative is "you are very confident, close this sale and move onto the next one". A priority of 1 has been assigned—it is important to close high probability business before working on other opportunities. The examples of FIGS. 8*a*-8*b* show that even though the sales representative has assigned the same probability in each case—because of the different points in the sales cycle (skill phase probe versus skill phase close), different priorities are assigned. In preferred embodiments of the sales automation system 10, even though the salesperson does not change the probability value through the sales cycle, the computer will automatically update the priority value based on the passage of time.

As in the examples of FIGS. 8 *a-b*, it is possible to construct a nine by three matrix 214 (FIG. 9) showing the relevance of the probability index to the phase of the sales cycle. For each probability index/skill phase combination it is possible to assign three pieces of information that are of value to the sales representative:

(1) A simple explanation 216 of what kind of skill phase to expect (i.e. Thorough Probe, Hopeless Close etc.).

(2) An advice message 218 that recommends a strategy based on the assessed probability and the phase of the sales cycle, (i.e. "Sale is likely to happen. However, don't get complacent and spoil your leading position").

(3) A priority 220 to address this particular opportunity. In the illustrated example four priorities are assigned, ranging from 1 to 4, 1 being the highest. A special description of "leave it alone" has been given to priority 4. A special category of "breakthrough needed" is also assigned to the special case where the sale will definitely happen, but the sales representative has a low chance in the later stages of the sales cycle.

The three pieces of information listed above, which are derived from the matrix 214, are used to provide valuable feedback to the sales representative as the sales cycle progresses.

Figure 10:
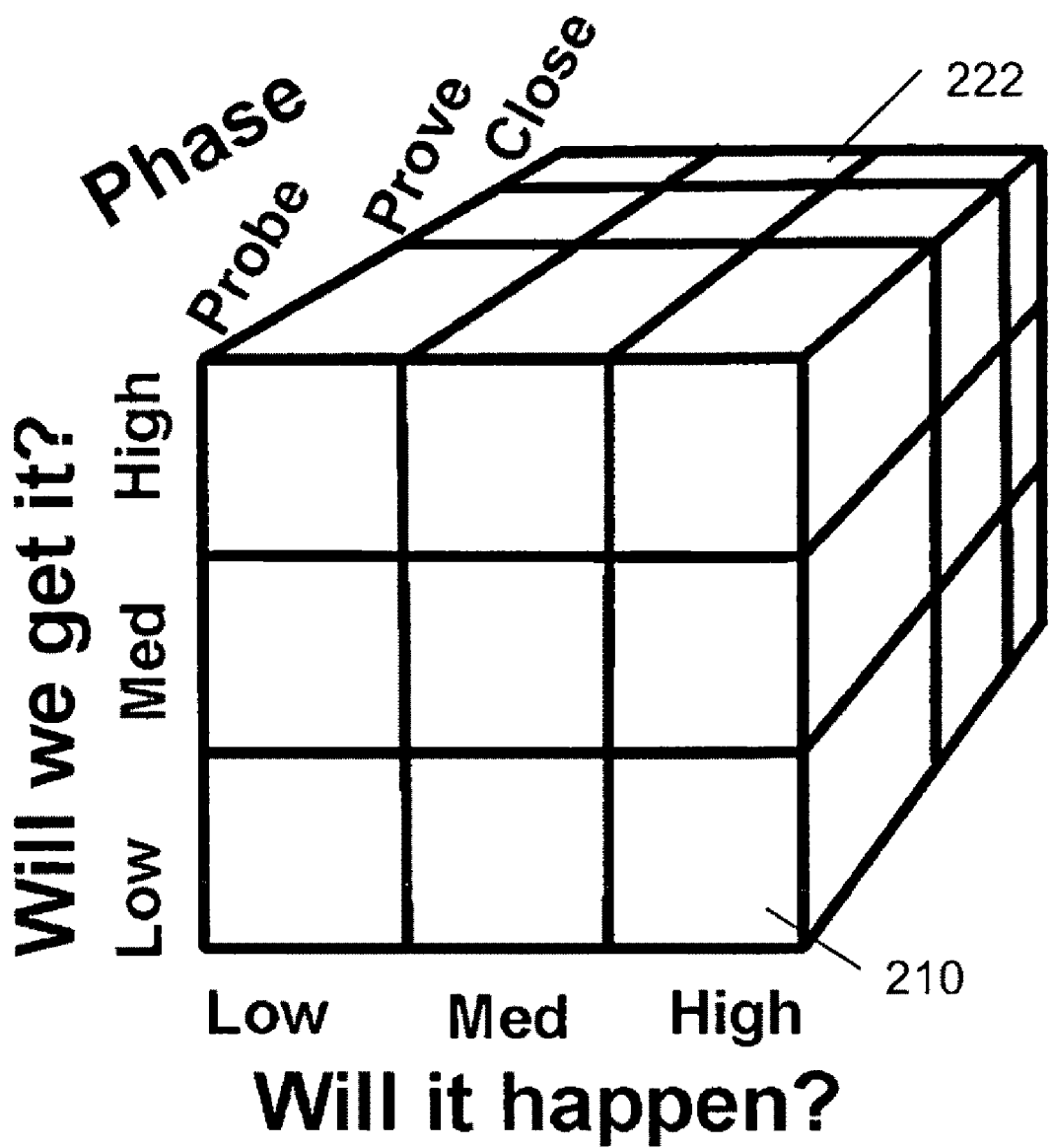
FIG. 10 is a representation of a priority cube.
Figure 11:
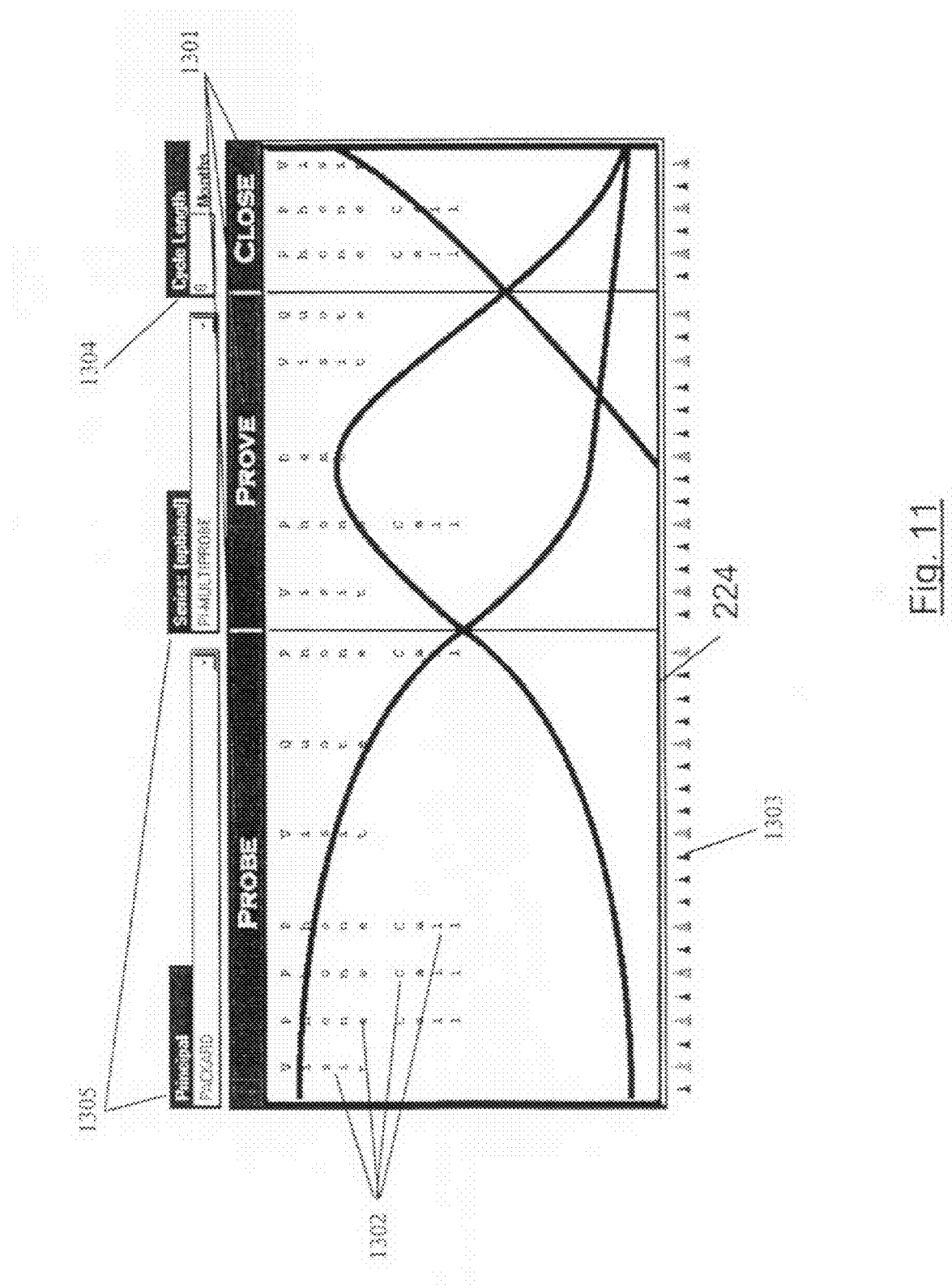
FIG. 11 is a representation of a user interface used to set up a sales model.

Another way to graphically represent the concept that priority must be deduced from a probability taken in the context of skill phase is shown in FIG. 10. The regular probability matrix 210 is shown, with axes of "Will it happen?" and "Will we get it?". In addition, a third axis is shown, which is actually the sales cycle divided into the three phases of probe, prove, and close. This forms a "priority cube" 222, composed of twenty seven unique elements, each with specific information on priority and intelligent response.

An overview of the concepts incorporated into preferred embodiments of the invention having been provided above, an example of the operation of the sales automation system 10 will now be provided.

Figure 13:
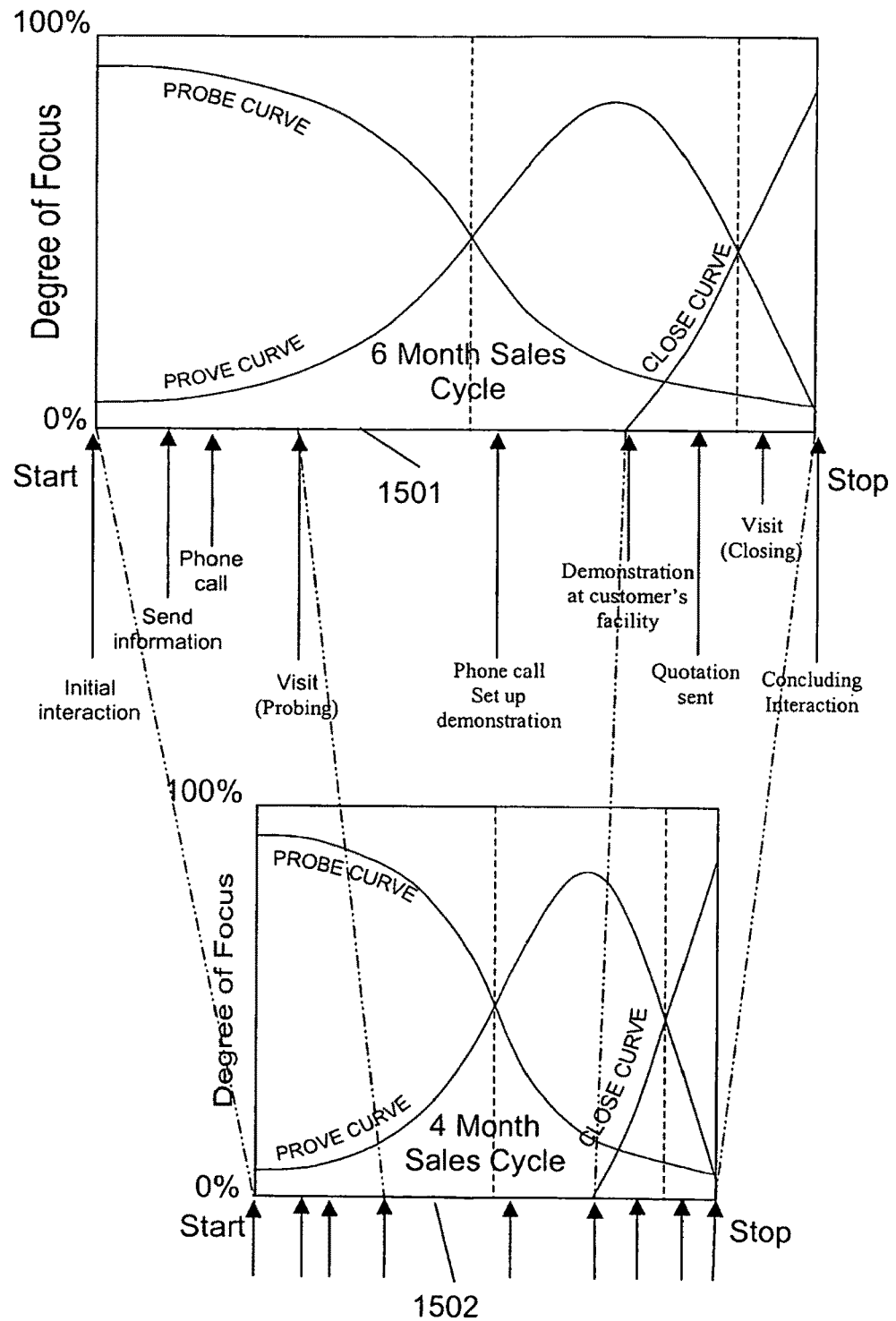
FIG. 13 are graphical representations similar to that of FIG. 3b further showing how the critical interactions can be scaled to fit the sales cycle length which can be changed by a user at any time in light of new information.

Generally, one of the first steps will be for a sales manager is to set up the sales model parameters in the computer system. This can be achieved using a graphical representation 224 of the sales cycle as the user interface 130 on the sale's managers computer screen as shown in FIG. 13. Key elements of the sales model are shown on the screen (i.e. the probe, prove, and close phases 1301, the types of critical activities 1302, and triangle icons 1303, each of which represent a unit of time along the sales cycle). When a triangle icon 1303 is clicked, a dialog box allows the user to enter a critical activity from a range displayed. The critical activity can also be tagged as mandatory or discretionary (which can be shown as different colors on the display screen). In addition, the average length of the sales cycle is also entered in an average length field 1304, and a product field 1305 is filled in to identify the product to which the sales cycle is applicable. In the illustrated embodiment, the probe, prove, and close phases are assigned 50%, 35%, and 15% of the sales cycle, respectively. It would also be possible to allow the sales manager to set up other relative durations for the skill phases.

Figure 12:
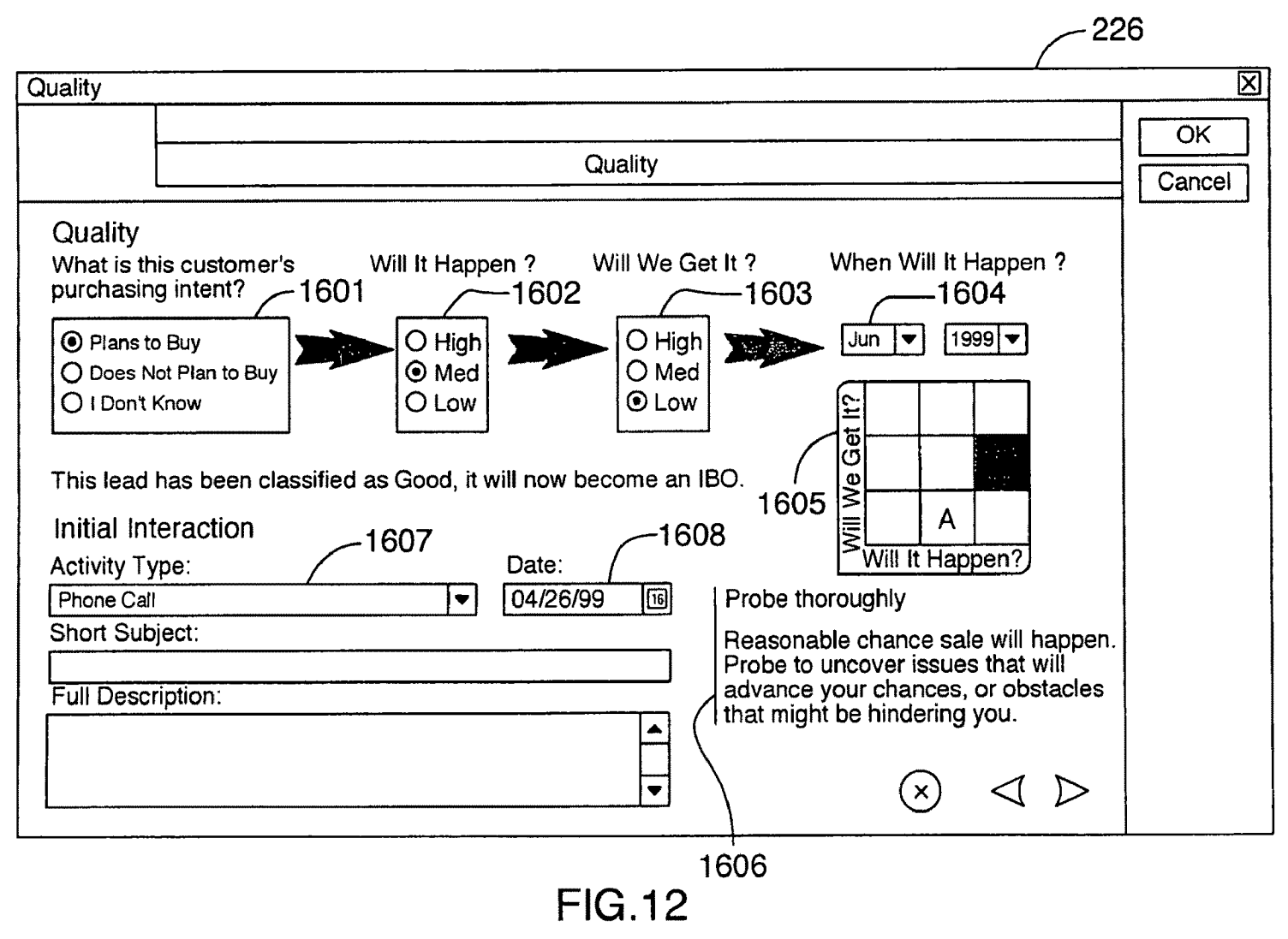

As noted above, a user interface 130 allows a user such as a sales representative to enter information about customer interaction for use by an interaction monitor 160, and to enter other information for use by an information monitor 150. When a sales representative identifies a situation where a customer has started the buying process, he enters the sales opportunity into the sales automation system 10. An example of the graphical user interface 226 used to log new sales opportunities into the computer program is shown in FIG. 12. The sales representative is prompted to select from a drop down list an "activity type" 1607 of the initial interaction with the customer, and the date 1608 of the initial interaction. The date that the opportunity is entered is defined as the beginning of the sales cycle. Qualifying questions 1601, (for example "What is this customer's purchasing intent?") are presented to the sales representative, along with possible selectable responses (for example "Plans to Buy", "Does Not Plan to Buy" and "I Don't Know"). In the illustrated example, if the sale representative indicates that the customer plans to buy, he is presented with the questions "Will it happen?" 1602, followed by, "Will we get it?" 1603, and the sales representative is prompted to enter a response of "High", "Medium" or "Low" to each of these two questions. The sales representative is then requested to enter the date that he expects the sale will conclude, as a win or a loss, through the question "When will it happen?" (month and year), 1604. Based on the entered answers to the "Will It Happen" and "Will We Get It", the computer brings up the probability matrix, 1605, with the appropriate probability index highlighted. Beneath the probability matrix the system displays information, 1606, derived from the priority table 214 shown in FIG. 9.

Based on the entered conclusion date, the system calculates the length of the sales cycle the representative has entered. This is referred to as the "actual" sales cycle (FIG. 3*a*). If the sales representative is late in recognizing the start of the customer's buying process, the actual sales cycle will be shorter than the customer's sales cycle (FIG. 3*a*). The model sales cycle stored in the computer (as predetermined by the sales manager) is the average sales cycle for the product in question. If the length of the actual sales cycle entered differs from the average sales cycle (FIG. 3*a*) as stored by the model, the rules processor 140 warns the user that an abnormal situation exists and that special strategies may have to be implemented. The aspects of the model sales cycle which are time related, such as cycle length, activities, probe, prove, and close phases, are scaled to the actual sales cycle length. This is exemplified in FIG. 13, where a model sales cycle 1501 of six months is scaled to the actual sales cycle 1502 duration of four months 1502.

The automation system 10 is preferably configured so that If, part way through the sales cycle, the sales representative discovers that the customer is, for whatever reason, prolonging the purchasing decision, then he will change the expected conclusion date for the sale. The sales automation system recalculates the sales cycle length within the new parameters and automatically scales the features of the model to the new length.

Figure 14:
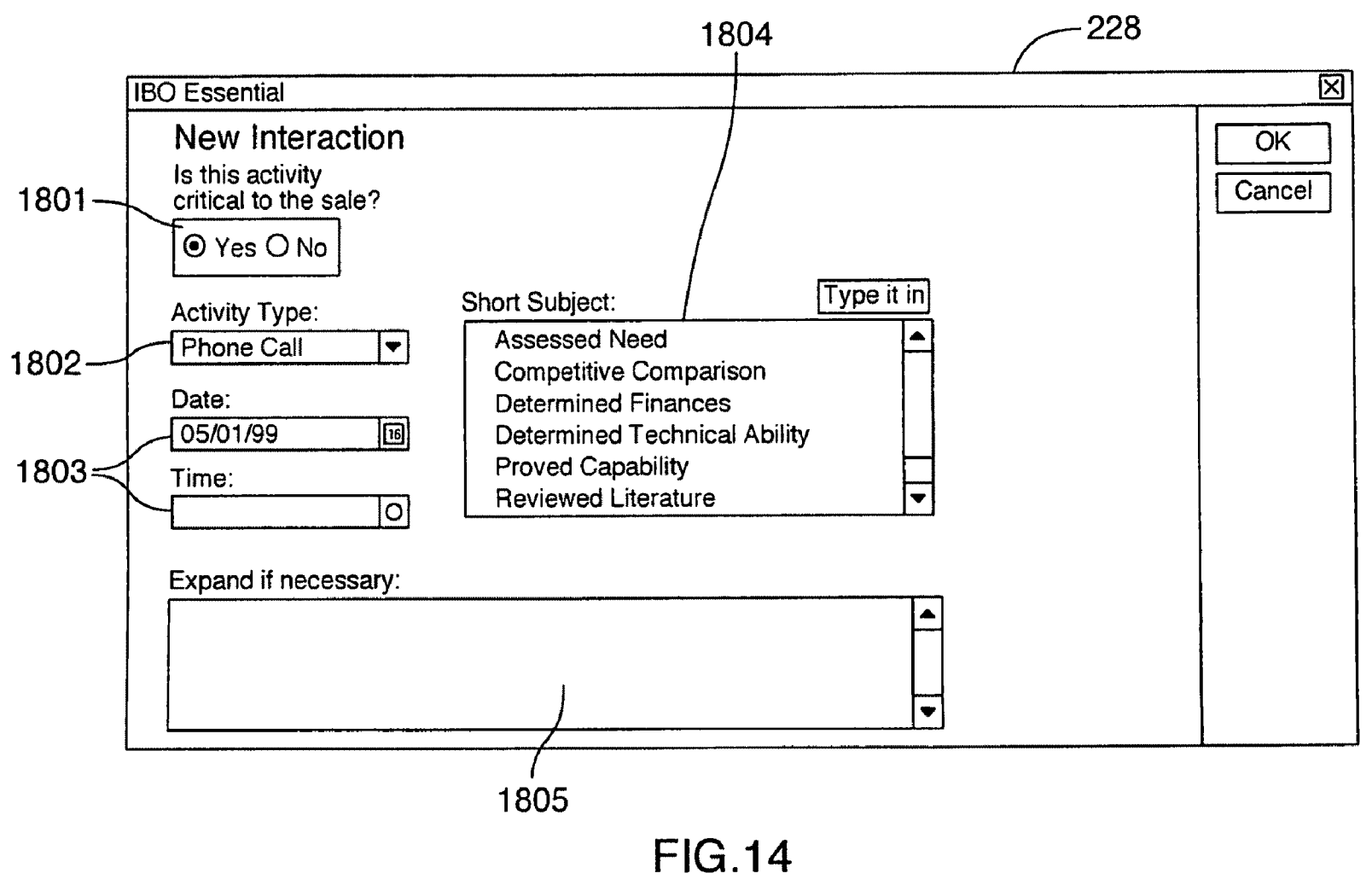

In one preferred embodiment, a new customer interaction is recorded through a "new interaction" graphical user interface 228, generated by the software of the sales automation system, shown in FIG. 14. The sales representative is first prompted to identify at field 1801 if the new interaction is "critical"—that is, does it contribute to the knowledge of the progress of this specific sales opportunity. This invention is different to other sales automation systems which do not make the distinction between critical and non-critical information. If such a distinction is not made, views that show opportunities and associated interactions become "cluttered" with extraneous information (i.e. "I called the customer but he was not there"). Non-critical information can be recorded by answering "no" to the question 1801, in which case the screen changes to remove the list of critical activities 1804 to allow the representative to type in details of the non-critical interaction. If the interaction is critical, an activity type 1802 and short description 1804 of the interaction may be selected along with the date and time 1803 of the interaction. The sales representative may input any other details that they see fit in optional field 1805.

Figure 15:
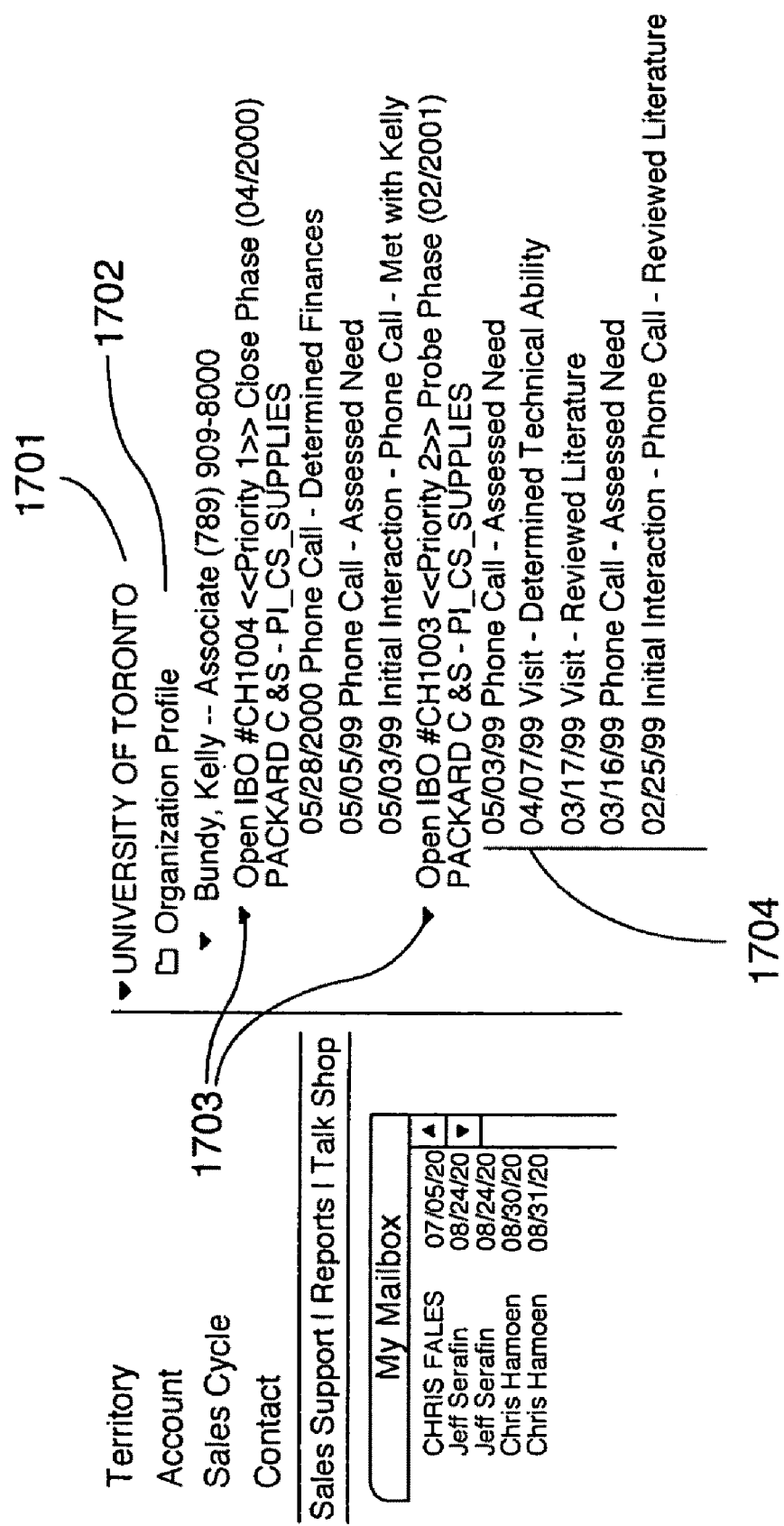
FIG. 15 is a graphical representation showing customer interaction data.

With respect to displaying interactions that have been entered, the sales automation system, according to preferred embodiments of the invention, has the ability to associate, or link, customer interactions with a specific sales opportunity, and therefore with a sales cycle belonging to that opportunity. This makes it possible to easily view a specific opportunity and its historical interactions, without viewing information from other opportunities, including those that are past or closed, belonging to the same contact. FIG. 15 is an example of a graphical user interface based on this type of database structure, and shows the account 1701 the customer or contact 1702 and the sales opportunities 1703 as they appear in a summary "view" in the program. Each line in the view is a document that can be opened to provide more detailed information. In FIG. 15, the account is level one 1701. The contact belonging to the account is shown indented at level two 702. A contact may have a number of current or past opportunities, which show up indented under the contact, as level three, 1703. In the display shown in FIG. 15, critical interactions pertinent to a particular activity as linked specifically to that opportunity are shown. In this way, it is possible to see the chronological sequence of customer/sales representative interactions that occur through a given sales cycle. Sometimes a contact may have more than one opportunity at one particular point of time. By linking an activity with the opportunity to which it is relevant, it is possible to see the exact sequence of activities or interactions that influence the specific opportunity, without the clutter of information from other situations or past history. This is shown in FIG. 15, where the interactions for a specific opportunity, 1704, appear under that opportunity in chronological order, essentially "mimicking" the horizontal time axis of the sales cycle model. In this example the contact "Kelly Bundy" has two opportunities (IBO is an "Identified Business Opportunity"), with interactions that have occurred for each.

Figure 16:
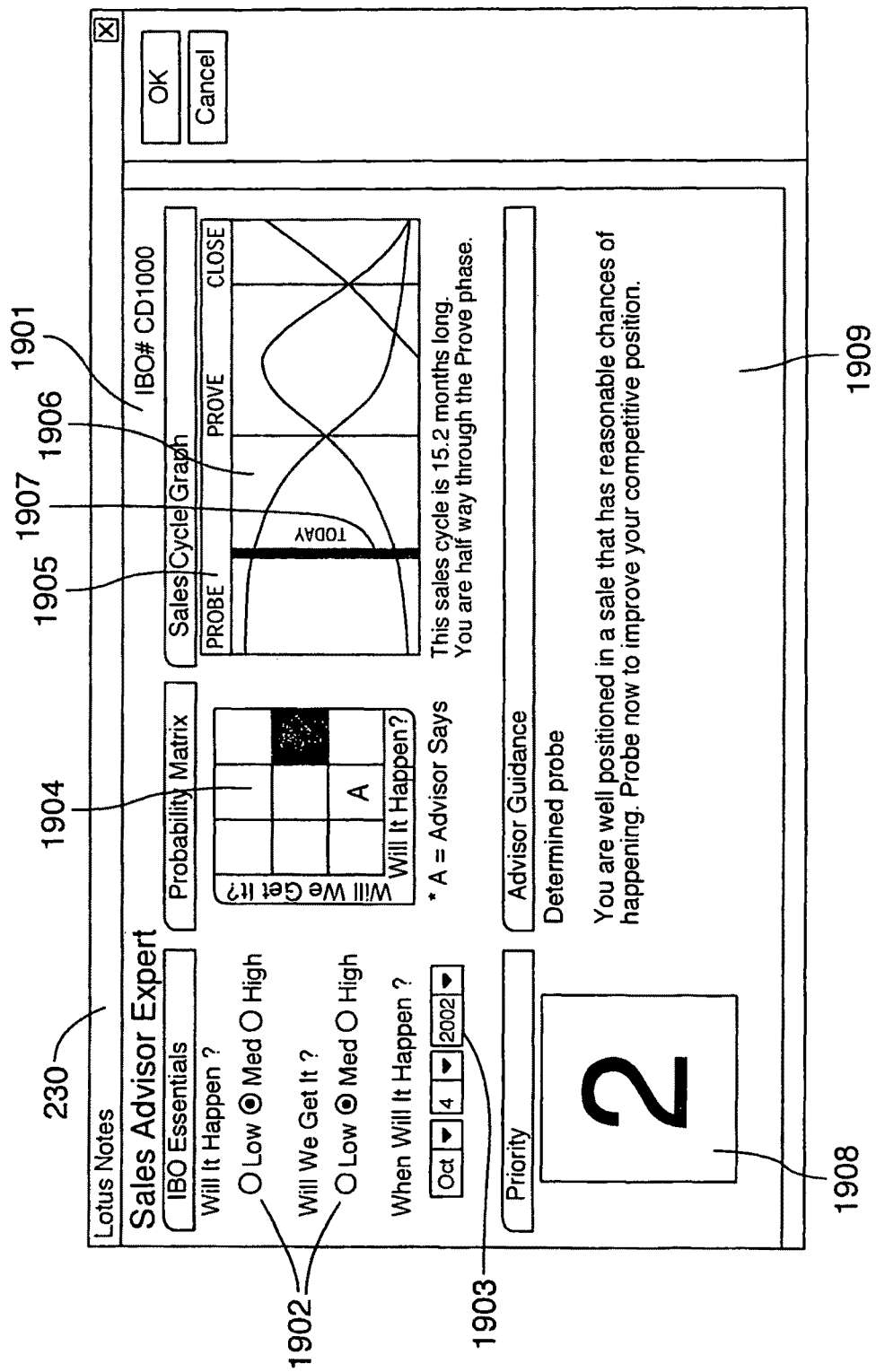
FIG. 16 illustrates a display screen used to display data and also modify data concerning a sales opportunity.

FIG. 16 shows an informational display screen layout 230 that can be generated by the sales automation system 10 which displays the key parameters of a subject sales opportunity, as entered through the entry process described with reference to FIG. 12. These parameters are called the "IBO essentials". The screen 230 is presented to trigger the sales representative to update essential information in the event that circumstances have changed. (As indicated in FIG. 16, each sales opportunity is assigned a unique number 1901. This number is used to link and track activity associated with the opportunity during the sales cycle.)

Using the buttons 1902 the representative is able to update the probability matrix for the opportunity, which is displayed as a nine point matrix, 1904, and using fields 1903, update the expected date for the sale to happen. A representation of the sales cycle and the current phase 1905 are shown. Also shown is a vertical bar 1907 indicating the current position in the sales cycle. The priority (1908), as determined by the nine by three matrix 214, is also shown, as is the advice information 1909 obtained from the same matrix. Priority and advice information are updated as the representative changes the "Will it happen?" and "Will I get it?" buttons. This information also changes automatically in the event that time has passed to put the opportunity into another phase of the sales cycle, even though the sales representative may not have input any data. This is because the assessed priority is affected by which phase one is at within the sales cycle.

The graphical user interfaces displays used to elicit additional information from the sales representative about a sales opportunity will now be discussed with references to FIGS. 17a-17c, which show example displays for entering information gathered using the probing, probing and closing skills, respectively. The "sales environment" encompasses all aspects and circumstances surrounding the sale that ultimately affect whether the salesperson will win the sale or not. The salesperson must make it a primary objective to obtain information that allows him or her to understand the sales environment. The sales environment usually changes as the sales cycle progresses, and therefore this information gathering activity must constantly be used. Different types of information are required, depending on the phase of the sales cycle.

Under the sales model of the present invention, the probing skill can be used throughout the sales cycle, though the majority of probing is done in the probe phase. When probing, it is important to gather as much information as possible about the factors that influence the sale. This information may be positive or negative, with respect to the motives of the sales representative. Negative information would be, "the competition is ahead at this point in the sale". Without this information however, the representative cannot change strategies to rectify the situation. FIG. 17a shows a computer screen for entering information gathered using probing. By clicking on the "probe" tab, 2001, the user is presented with a series of probe questions. In the illustrated embodiment of the sales automation system incorporating this invention the questions are generic, but in other embodiments the questions can be customized for a particular product or industry. In this graphical user interface the user merely has to choose between possible answers to the questions from drop-down lists. For instance, the answer to "What are the chances of the customer receiving funding?" can be either "Good", "Poor", or "Unknown". To fill in this type of interface requires little time for the user. The user input screen 232 also asks the sales representatives who the decision-makers in this sale are (field 2004), how influential they are (field 2005), and what is important to them in making their decision (field 2006). The computer interface allows the sales representative to enter or change information any time through the sales cycle, if the environment surrounding the sale changes, and not just during the probe phase.

FIG. 17b shows a screen 234 of the questions presented in respect of the proving skill of the sales representative, and is activated when the prove tab 2002 is pressed. These questions ask the sales representative "to what degree has he proved?". In the illustrated embodiment, the major decision-makers that have been identified from the probe phase input screen 232 are listed. The user is required to click an appropriate button 235 indicating the "degree of proving" required for each decision-maker, with respect to the determining factor that affects their decision. There are five options, ranging from "not convinced" to 'convinced". For instance, in FIG. 17b, Cyril Chaput, the economic decision maker, is concerned about price, his influence on the decision is high, and the relationship he has with the sales representative is good. The sales representative has clicked a four out of five, meaning that he thinks he has convinced Cyril Chaput to the 80% level.

FIG. 17c shows a screen 236 of the questions presented in respect of the proving skill of the sales representative, and is activated when the close tab 2003 is pressed. The sales representative is asked if he has attempted to close the sale (this is called a trial close). If not, the program will remind him throughout the close phase that he should do so. If he has attempted to close the sale he must answer the question "is the customer prepared to buy your product?". If the answer is yes, the sales representative is given the option of closing the opportunity. If the answer is no, then the sales representative is required to state the barriers to winning the sale; these could be issues such as price, service, or technical performance of the product. In the illustrated embodiment, the barriers are chosen from a drop down list of possible generic choices, however in some embodiments they may be user definable. The input screen 236 also prompts the sales representative to determine a strategy to handle the customer's objections (field 2007). These strategies may also be chosen from a drop down list. Once the strategy has been entered, the sales representative will be prompted to indicated if the strategy has been implemented. If it has, this represents the beginning of another trial close loop. The essential details of each trial close are stored for review. The sales representative will keep making trial closes, using strategies to overcome the barriers to the customer making a decision, until the sale is won or lost.

In some embodiments, the sales automation system measures the number of trial closes made against time, and advises the user if trial closes need to be made. In addition, as the process of closing starts roughly half way through the prove phase, the sales automation system directs that at least one trial close should be made in the last half of the prove phase. The system may display a message to reinforce the point that it is bad to try to close a sale too early, if the user attempts to open the close tab 2003 before the maximum point in the proving curve has been reached.

Intelligent Response Mode

In one preferred embodiment of the invention, the sales automation system 10 is configured to provide intelligent responses to the sales representative, as explained in greater detail below.

The sales automation system is configured to determine based on pre-defined rules, and based on information entered by the sales representative, computer generated answers for the "IBO Essentials" (namely, answers to the questions "Will it happen?" and "Will we get it?" and "When will it Happen"), compare if the computer generated answers match those provided by the sales representative, and based on such comparisons, provide some feedback or advice to the sales representative. As the IBO Essentials are used to determine probability and priority, the ability to check the salespersons assessment for correctness is a desirable feature. The detailed information gathered through the interfaces shown in FIGS. 17a-17c about the sales environment can be used to double check the sales representative's assessment of the IBO essentials.

Figure 18:
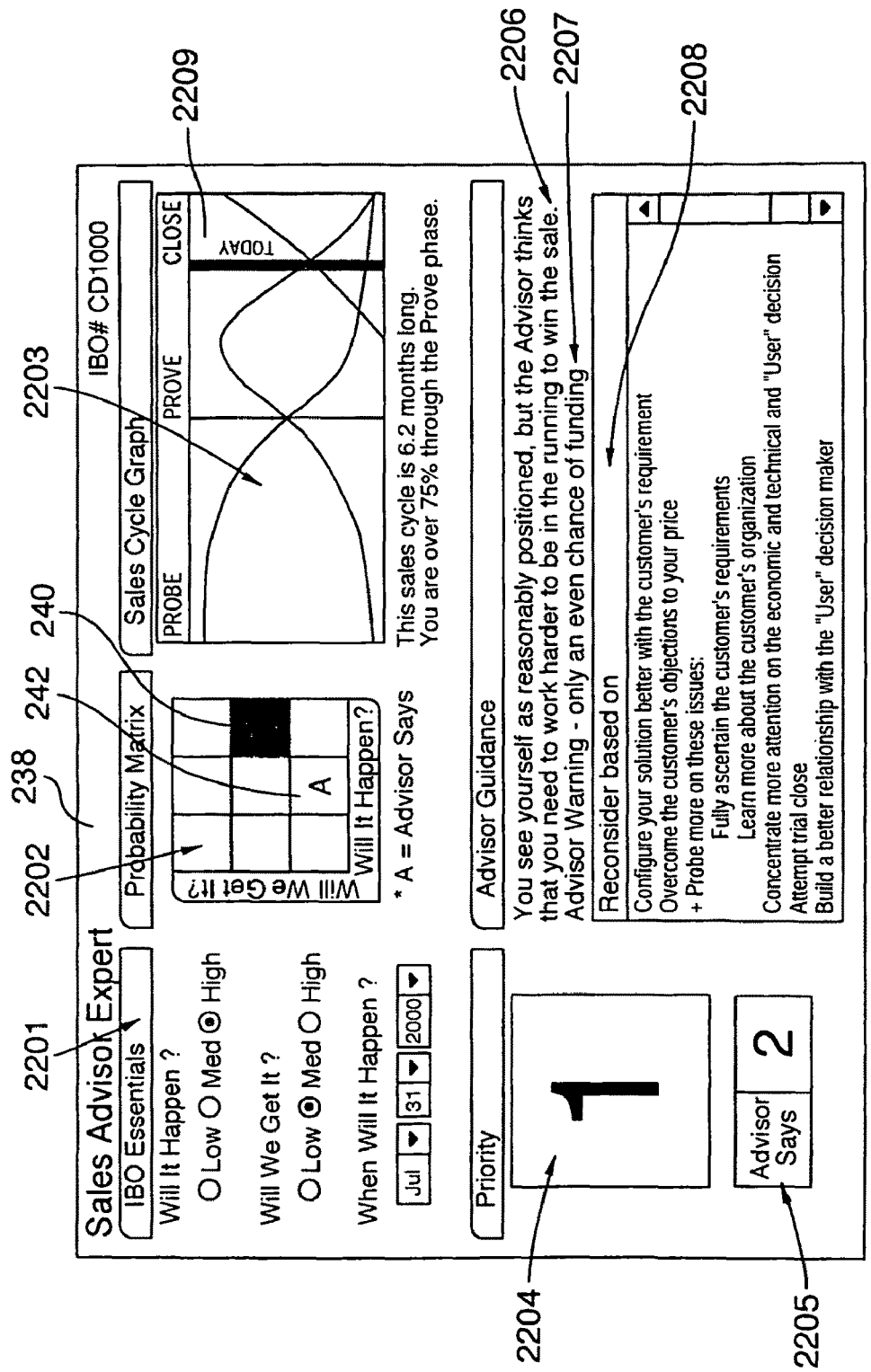
FIG. 18 shows a graphical user interface for an intelligent response mode of operation.

FIG. 18 shows an example of a graphical user interface 238 for operation of the program in an intelligent response mode. The interface is similar to that of FIG. 16 in that it has an IBO essentials entry/display area 2201 ("Will it happen?", "Will we get it?", and "When will it happen?"), a probability matrix display area 2202, and a diagram of the sales cycle 2203 showing the current point in time by means of a vertical bar 2209. Also displayed is the priority value 2204 derived from the sales representative's assessment of the IBO essentials. In the probability matrix display 2202, the sales representative's assessment of "high" for the question "will it happen" and "medium" for the question "will we get it" is illustrated by box 240.

In addition to the information shown in FIG. 16, in "intelligent response mode", the computer calculates its own values of "Will it happen?", and "Will we get it?" (Medium and low in the illustrated example) and this is presented on the probability matrix 2202 by another index block 242. As the sales automation system calculates a different probability than the user in the illustrated example, the priority 2205 that it calculates in this case is also different and is shown underneath the user's priority.

In a message section of the graphical user interface 238, the messages are quite different to those shown in FIG. 16, which are derived from the twenty-seven entry priority table 214 only. In FIG. 18, the intelligent response mode provides more context sensitive advice 2206, 2207, 2208 to the salesperson.

As will be explained in greater detail below, the first message field 2206 is displayed in response to differences in computer generated probability and the user's probability. The second message field 2207 is displayed in response to differences between the computer and user assessments of the question "Will it happen?". The third message field 2208 is the sales automation systems detailed comments based on its calculation of the probability index from the probe, prove, and close questions concerning the sales environment.

The criteria used by the sales automation system 10, and in particular the rules processor 140, to determine answers to the questions "Will it Happen" and "Will we get it" based on data entered by a sales representative regarding the sales environment and the stored sales model will now be explained in respect of one preferred embodiment of the invention.

Turning firstly to the question of "Will it Happen?", in one embodiment, the sales automation system assigns an answer to such question based on the sales representative's answers to the two questions: 1) What are the chances of the customer receiving funding? (Possible answers: Certain, Fair, Low and Unknown); and 2) What is the customer's level of need? (Possible answers: Urgent, Normal, Low or Unknown) (recall that such questions are part of the informational "proving skill" questions, as shown in FIG. 17a).

Table 1 shows how the various combinations of the answers to these two questions as provided by the sales representative are used by the sales automation system to determine the value of "Will it happen?" If the answer to either question is "Unknown" then it is categorized as Low in the table.

TABLE 1

| Chance of Funding | Level of Need | Will It Happen? |
|---|---|---|
| Certain | Urgent | High |
| Certain | Normal | High |
| Certain | Low | Med |
| Fair | Urgent | Med |
| Fair | Normal | Med |
| Fair | Low | Low |
| Low | Urgent | Med |

TABLE 1-continued

| Chance of Funding | Level of Need | Will It Happen? |
|---|---|---|
| Low | Normal | Low |
| Low | Low | Low |

As mentioned above, the "Advisor" message 2207 of the display screen 238 is determined by the sales automation system in response to differences between the sales representative's answer to the question "Will it Happen" and the computer assigned answer. The table shown in FIGS. 19a-19b demonstrates how the rules processor 140 uses intelligent response technology to construct messages to the user pertinent to "Will it happen?", based on the answers that the salesperson has provided on the questions of funding and needs. Column 260 shows sample "Advisory"' messages that will be issued based on the various possible combinations of: the sales representative's answer to "Will it Happen" (column 244); the computer determined answer to "Will it Happen" (column 246); and the sales representative's answers to the questions noted above concerning availability of funding (column 248) and level of need (column 250). For example in one of the cases 262 shown in FIG. 19a, the salesperson has answered "Will it happen?" as Low. The computer has calculated "Will it happen?" to be Med because, according to the salesperson, funding is Certain while the level of need is Low. In this case, the computer (referenced as the Sales Advisor) is able to present the message, "Advisor alert: funding will happen, despite a low need?" This challenges the salesperson to check his or her evaluation of the sales environment. Maybe the chances of funding are Low, maybe the customer's need is higher than thought—or maybe, on reflection, the "Will it happen?" is Medium.

Turning now to the analysis of the question "Will we get it", in a preferred embodiment there are six factors that affect the computer's determination of "Will we get it?", namely: (1) results from the interaction monitor 160; (2) results from the information monitor 150; (3) the degree of competitive pressure; (4) the degree that the product matches the customer's needs; (5) How the price of the product matches the customer's budget; and (6) The sales representative's relationship with the decision makers. It will be recalled that the sales representative is prompted to answer questions regarding factors (3), (4) and (5), as indicated in FIG. 17a, and also to provide relationship information, as indicated in FIG. 17b.

In classifying the answer to the question "Will we get it?" as one of three values: High, Medium or Low, each one of the factors (1)-(6) is considered to determine its contribution to the final answer to "Will we get it?" in terms of High, Medium or Low. The answers are then grouped together to get the collective categorization for the final answers. The methodology used to assign a High, Medium of Low in respect of each of the factors (1) to (6) will now be explained in accordance with one embodiment of the invention as follows:

(1) Interaction Monitor Factor:

The interaction monitor 160 counts the number of critical interactions that have occurred between the salesperson and the customer, and compares this against the number that should have occurred as defined by the sales model. This embodiment takes the ratio of interactions completed divided by interactions required. If all or more interactions have been completed, this ratio is 100% or higher and the Interaction monitor factor (1) is assigned a "High" contribution to "Will we get it?" (the more work that has been done in the sales, the higher the chances of winning it). If the ratio is less than one hundred percent but greater or equal to fifty percent, the contribution to "Will we get it?" is assessed to be Medium. If the ratio is lower than fifty percent, the contribution to "Will we get it?" is assessed as Low.

(2) Information Monitor Factor.

The information monitor deals with the acquisition and quality of information. Acquisition of information is determined by the number of probing questions that have been answered at a point in the sales cycle compared with the number that should have been answered at that time according to the sales model. The quality of information is judged by the value of the answer to the question and is judged separately from whether the sales representative probed for the answer or not.

In a preferred embodiment, the sales automation system divides the amount of information gathered by the amount of information required. If all information has been obtained, this ratio is 100% and the information monitor factor is assigned a "High" contribution to "Will we get it?" (the more information that has been obtained in the sale, the higher the chances of winning it). If the ratio is less than one hundred percent but greater or equal to fifty percent, the contribution to "Will we get it?" is assessed to be Medium. If the ratio is lower than fifty percent, the contribution to "Will we get it?" is assessed as Low.

(3) Competitive Pressure Factor.

If the level of competitive pressure has been entered by the sales representative as high in the sales situation, the contribution of the competitive pressure factor to "Will we get it?" is assessed as Low. If the level of competitive pressure has been identified by the sales representative as is medium in the sales situation, the contribution to "Will we get it?" is assessed as Medium. If the level of competitive pressure has been identified by the sales representative as low in the sales situation, the contribution to "Will we get it?" is assessed as High (if the competitors are weak, we have a greater chance to win the sale). If the level of competitive pressure is identified as "unknown", the contribution to "Will we get it?" is assessed as Low.

(4) Product Matching the Customer's Needs Factor.

If the product has been identified by the sales representative as having a high degree of matching the customer's needs, the contribution of factor (4) to "Will we get it?" is assessed as High. If the product has been identified as having a medium degree of matching the customer's needs, the contribution to "Will we get it?" is assessed as Medium. If the product has been identified as having a low degree of matching the customer's needs, the contribution to "Will we get it?" is assessed as Low. If the product's match to the customer's needs is unknown, the contribution to "Will we get it?" is assessed as Low.

(5) Matching the Customer's Budget Factor.

If the price of the product has been identified by the sales representative as matching the customer's budget, the contribution of factor (5) to "Will we get it?" is assessed as High. If the price of the product is higher than the customer's budget, the contribution to "Will we get it?" is assessed as Medium. If the price of the product is much higher than the customer's budget, the contribution to "Will we get it?" is assessed as Low. If the customer's budget is unknown, the contribution to "Will we get it ?" is assessed as Low.

(6) Relationships with Decision Makers Factor

If the sales representative's relationship with the decision maker is good, then the contribution of factor (6) to "Will we get it?" is assessed as High. If the relationship is OK, then the contribution to "Will we get it?" is also assessed as High. If the relationship is bad, then the contribution to "Will we get it?" is assessed as Low. In the illustrated embodiment of the invention, there are three separate decision makers, the economic, the technical and the user. The relationships as defined by the sales representative can be combined to get the overall contribution for factor (6) to "Will we get it?" For example, if the sales representative has identified that his relationship with each of the three decision makers is at least "OK", then the contribution of factor (6) is "High". If the sales representative has identified that he has a bad relationship with only one decision maker, but a good relationship with at least one of the other two, then the contribution of factor (6) is "Medium". If the sales representative has identified that he has a bad relationship with at least two of the decision makers, then the contribution of factor (6) is "Low". In some situations, the user inputted degree of influence for each of the decision makers (see field 2005, FIG. 17*a*) may be used to determine the contribution of factor (6). For example, in the event that the sales representative has indicated that he has an OK relationship with two decision makers and a bad relationship with the third, the level of influence of the decision makers could be taken into account—for example, if the "bad" relationship decision maker has low level of influence, the contribution of factor (6) may be assessed as "Medium", whereas if the "bad" relationship decision maker has a high degree of influence, then the contribution of factor (6) may be assessed as "Low".

Thus, by following the methodology set out above, the sales automation system 10 can assess for each of the six factors noted above a High, Medium or Low contribution to the issue of whether the subject company or the competition will win the sale. These results must then be distilled down to a single set of High, Med and Low values that reflect an amalgamation of the six factors. In the preferred embodiment, the results are considered differently depending on whether the sales cycle is in the probe phase or in the prove or close phase.

In the probe phase, factor (6), namely relationships with the decision makers is ignored, and only the "High", "Low" or "Medium" assessments calculated in respect of the other five factors (1)-(5) are considered, and each of these five contributing factors are assumed to contribute equally to the possibility of "Will we get it?" In one exemplary embodiment, if at least three "Highs" and no "Lows" (for example, the combined assessments of H-H-H-H-H; H-H-H-H-M; or H-H-H-M-M, where H=high, M=medium and L=low) have been cumulatively assessed in respect of the five factors, then "Will We Get It?" is assigned a "High". If the forgoing is not the case, and at least three "Highs" and at least one "Low" (for example H-H-H-H-L; H-H-H-M-L; or H-H-H-L-L) have been assessed, or if the five factors have received assessments of H-H-M-M-L; H-H-M-L-L or H-M-M-M-M, then "Will We Get It?" is assigned a "Medium". If no more than one "High" and at least one "Low" have been cumulatively assessed for the five factors, or if no "Highs" have been assessed, then "Will We Get It?" is assigned a "Low". Special conditions may also be set for some combinations—for example the combination of two "Highs" and three "Mediums" (H-H-M-M-M) could cause a further determination to be made as to whether either, but not both, of the information monitor factor and interaction monitor factor where assessed as high, in which case a "Medium" would be assigned to "Will we Get It", and in the event that neither of the information monitor or interaction monitor factors were assessed as "High", then a "Low" would be assigned to "Will we get It".

When determining the answer to the question "Will we get it" in the prove and close phases, all of the six factors (1)-(6) are considered, including the relationship with decision makers. If at least five of the factors (1)-(6) have been assessed as "Highs", of if at least four of the factors (1)-(6) have been assessed as "Highs" at the same time that none have been assessed as "Low", then a "High" will be assigned to the question "Will we get it?". The following combinations for the six factors (order is not important) will result in a "Medium" being assigned to the question "Will we get it?": H-H-H-H-L-L; H-H-H-M-M-M; H-H-H-M-M-L; H-H-H-M-L-L; H-M-M-M-M-M; H-H-M-M-M-L; H-H-M-M-L-L; H-M-M-M-M-M and H-M-M-M-M-L. The following combinations for the six factors (order is not important) during the prove and close phases will result in a "Low" being assigned to the question "Will we get it?": H-H-L-L-L-L; H-H-M-L-L-L; H-M-M-M-L-L; H-M-L-L-L-L; H-L-L-L-L-L; L-L-L-L-L-L; M-M-M-M-M-M; L-M-M-M-M-M; L-L-M-M-M-M; L-L-L-M-M-M; L-L-L-L-M-M and L-L-L-L-L-M. Again, in the prove and close phases, some combinations can be treated as special cases with further considerations. For example, the combination H-H-H-H-M-L could result in a "High" assignment for the question "Will We Get It?" if both the information monitor and interaction monitor factors had been assessed as "High", or could result in a "Medium" assignment if only one of the information monitor and interaction monitor factors had been assessed as "High". The combination H-H-H-L-L-L could result in a "Medium" assignment for the question "Will We Get It?" if both the information monitor and interaction monitor factors had been assessed as "High", or could result in a "Low" assignment if only one of the information monitor and interaction monitor factors had been assessed as "High".

Figure 20A:
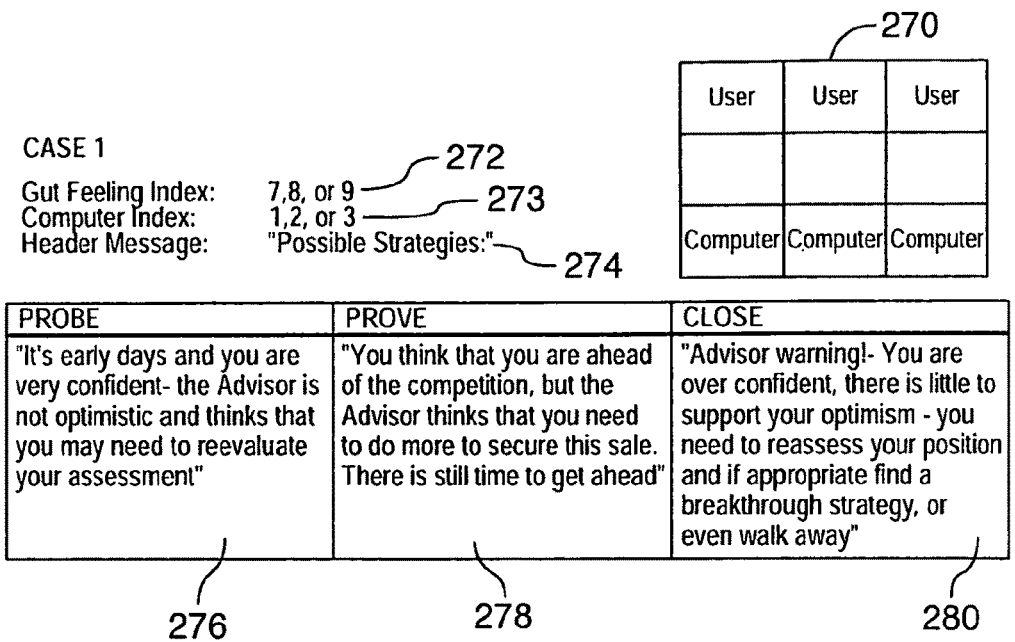
Figure 20B:
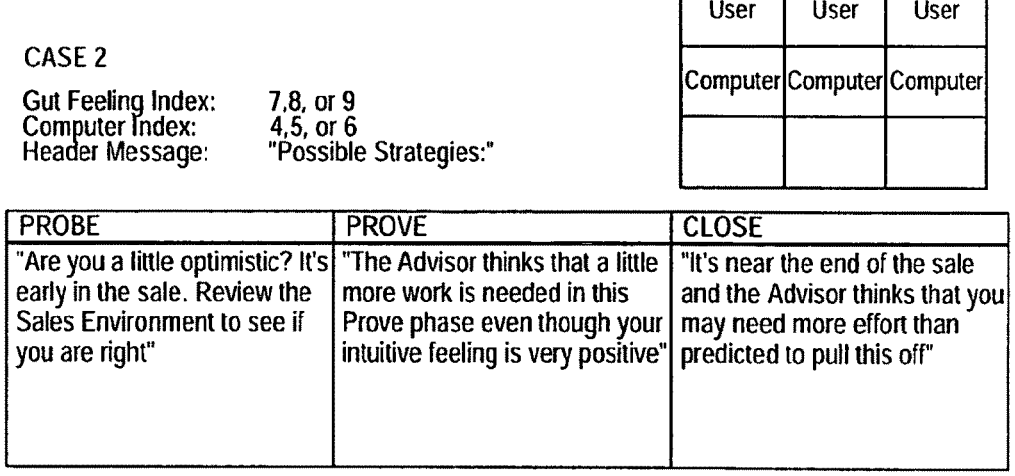

With reference to FIG. 18, in the illustrated example, the computer assigned values to the questions "Will we get it?" and "Will it happen?" as determined based on the above described methodology are shown on the probability matrix 2202 as a block 242. It will be recalled that each block or cube in the probability matrix represents a probability index value from 1 to 9. As mentioned above, the message 2206 is derived from a comparison of the probability for a sale opportunity as determined by the sales persons answers to the questions "Will it happen?" and "Will we get it?" with the probability as determined by the sales automation system. Preferably, the content of message 2206 depends also on the location in sales cycle at the time that the message is presented. FIG. 20*a* provides a diagrammatic representation of example content for the message 2206 in one possible case (Case 1). In the illustrated case, three different combinations of the sales representative's answers to the questions "Will it Happen?" and "Will We get It?" are represented in the matrix 270 (which corresponds to the probability matrix 210 of FIG. 6*a*) by the boxes labeled "User", and three different combinations of the sales automation assigned values to these two questions are represented in the matrix 270 by the boxes labeled "Computer". As illustrated in FIG. 6*a* each of the boxes in the matrix is associated with a probability index, and accordingly, Case 1 as illustrated in FIG. 20*a* corresponds to situations where the sales representative's answers to the questions "Will it happen?" and "Will we get it?" correspond to probability indexes of 7, 8, or 9 (the "Gut Feeling Index" 272 in FIG. 20*a*), and the computer generated answers correspond to probability indexes of 1, 2 or 3 (the "Computer Index" 273 in FIG. 20*a*). In Case 1, the content of the message 2206 will selected by the sales automation system 10 to includes a Header Message 274 of "Possible Strategies:", followed by the text shown in Probe column 276 in the event that the sales cycle is in the probe stage, the text shown in Prove column 278 if the sales cycle is in the prove stage, or the text shown in the Close column 280 is the sales cycle is in the close stage.

The various combinations and messages shown in Case 1 of FIG. 20a are examples of possible computer generated messages when a gap between the sales representative's "Gut Feeling Index" and the computer generated probability index differ. Other messages and combinations are possible, and in this regard, FIGS. 20b-20i illustrate, in the same format as FIG. 20a, further Cases 2-9 illustrating possible content for the message 2206 for various "Gut Feeling" and computer generated probability index combinations.

As mentioned above in respect of FIG. 18, further messages can be generated in field 2208. Such messages take into further consideration the interaction information and sales environment information that has been provided by the sales representative for a sales opportunity (such information being collected through the use of the interfaces shown in FIGS. 14 and 17a-c and used by the interaction monitor 160 and information monitor 150).

For example, with respect to entered interaction information (i.e. information corresponding to the fields shown in FIG. 14), the interaction monitor 160 is configured in one embodiment to cause different messages to be displayed in message area 2208 based on what percentage of interactions have occurred versus those that should have occurred, at a specific time in the sales cycle—as determined by the sales model. If not enough interactions have been completed, the summary message could be: "More interaction with the customer is needed". In some embodiments, the user may be able to request further information by clicking an appropriate button, In which case a list of interactions which should be completed will appear, including for example, one or more of the following possible statements: "Make a phone call"; "Arrange a meeting"; "Do a demonstration"; "Submit a proposal"; and/or "Perform a _____ (custom activity type)". If the interaction monitor 160 concludes that the user has completed all required interactions needed by the sales model then the message "All model interactions have been completed." could be displayed in the dialog box message area 2208.

With respect to entered sales environment information, the information monitor 15 can be configured to cause various messages to be displayed in the dialog box messages area 2208 depending on the information entered by the user in response to the probing skill related questions of FIG. 17a, the proving skill related questions of FIG. 17b and the closing skill related questions of FIG. 17c. In a preferred embodiment, the messages are selected based on the location in the sales cycle at the time that the message is provided.

By way of example, in one embodiment, if the user enters "Unknown" in respect of some of the probing skill questions shown in FIG. 17a and the information monitor factor (i.e. the contribution of the information monitor to the question "Will we Get it" as discussed above) has been assigned less than a high value, the information monitor 150 could cause the message "Probe more on these issues:" to be displayed, to which the user can request further information by clicking an appropriate button, in which case a list identifying steps to take to get more information in respect of the questions shown in FIG. 17a will appear. In one embodiment, the possible statements are "Fully ascertain the customer's requirements"; "You must determine the customer's level of need"; "Evaluate the match between your solution and the customer's requirement"; "Can the customer afford your solution?"; "Learn more about the customer's organization"; "How competitive is this situation?"; "You must identify your competition"; "Identify the economic decision maker"; "Identify the technical decision maker"; "Identify the user decision maker"; "How much influence does the economic decision maker have?"; "How much influence does the technical decision maker have?"; "How much influence does the user decision maker have?"; "What is most important to the economic decision maker?"; "What is most important to the technical decision maker?"; and/or "What is most important to the user decision maker?". It will be appreciated that these questions correspond to the probing skill questions shown in FIG. 17a.

If the information monitor determines that the user has performed enough probing at the relevant point in the sales cycle as defined by the sales model the message displayed can be: "Enough probing has been done up to this point in the sales cycle".

With respect to answers to the proving skill related questions as shown in FIG. 17c, the user entered answers to the "degree of proof" question is compared against the sales model to determine a message for display in dialog message area 2208. In one embodiment, the sales model assumes that 100% of proving must be achieved by the end of the prove phase and that the degree of proof follows a linear relation to progress through the prove phase, i.e., at fifty percent through the prove phase, the sales representative must have fifty percent of the proving complete. If the sales representative has proven less than he should at a particular point in the sales cycle, the message that appears is as follows: "Concentrate more attention on the Economic, Technical, and User decision maker(s)." If the user has done sufficient proving at the relevant point in the sales cycle, as defined by the model, then the message is: "Enough proving has been done up to this point in the sales cycle".

With respect to closing skill questions of FIG. 17c, in one embodiment the Information Monitor 150 is configured to assume that one trial close should have been made by the end of the prove phase. It also assumes that at least two trial closings should be made in the close phase. If this does not occur, then the message shown is: "Attempt a trial close."

Turning again to the probing skill questions of FIG. 17a, the effect of "Low" grade answers to such questions will be considered ("Low" grade meaning answers having a negative connotation). Although the questions in FIG. 17a may have been answered—which contributes towards information gathered—, in some cases the answers to those questions might adversely affect the issue of "Will we get it?" In this case, an appropriate message is shown in message area 2208. For example if the competitive pressure question have been answered as High or Med, the message is: "Watch out for the competition!"

If the answer to the question regarding the "match of your product to the customer's need" is Low or Med, the message is:" Configure your solution better with the customer's requirement." If the match of your price to the customer's budget is Low or Med, the message is: "Overcome the customer's objections to your price.". In response to "High grade" answers to questions regarding probing skills, the information monitor may be configured to cause messages such as "The competitive pressure is low."; if there is only moderate competitive pressure."; "There is a good match between your product and the customer's needs."; and or "You are within the customer's budget." to be displayed as appropriate.

Turning again to the proving skill questions of FIG. 17b, in the event that the sales representative has indicated a poor relationship with the decision makers, during the prove phase the information monitor 150 may cause the message "Improve your relations with the Economic, Technical and User decision maker(s)." to be displayed in message area 2208. In the event that a good relationship or OK relationship has been indicated by the user's answers, the respective messages: "Good relationship with the Economic, Technical and User decision maker"; or "Satisfactory relationship with the Economic, Technical and User decision maker" may be displayed.

It will be appreciated that the "intelligent messages" described above are merely exemplary, and different messages could be displayed and various different combinations of user inputted answers could be associated with messages different than those set out above. In some embodiments, algorithms could be used to assign weighting values to some or all of the possible answers for the questions shown in FIGS. 17a-c, and a cumulative value based on the user's answers determined, the commutative value being used by the automation system in combination with none, some or all of the known information about the sales model, current sales cycle phase, and user and computer generated probability indexes to select appropriate predetermined advice messages to provide to the user.

It will thus be appreciated that various aspects of the present invention are directed towards providing real and tangible results. For example, aspects of preferred embodiments are directed towards an improved method of determining the probability that the sales opportunity will be won by the sales representative in order to assist in achieving consistency from salesperson to salesperson and improving the accuracy of forecasting, thereby minimizing the potential risk to the company. The described method breaks from the traditional methods of requesting or assigning numerical percentages directly, and instead asks the sales representative to answer, using one of three possible answers of "High", "Medium" or "Low" two simple questions—"Will this sale happen", and if it will, "Will we get it?", from which a probability index is determined based on the nine possible answers.

According to a further aspect, the invention is directed towards a new method of determining what priority should be assigned to a sales opportunity, to indicate the degree of effort that a salesperson should give to one opportunity over another. The described method derives priority from assessing probability in the context of point of time in the sales cycle. Particularly, the method removes the effect of different sales cycle lengths by normalizing the sales cycle to three time phases during which a fundamental selling skill is predominant. This procedure has the effect of normalizing sales cycles of different lengths. This procedure is also beneficial because it reinforces use of the fundamental sales skills as the salesperson reviews their list of opportunities.

Another aspect of the present invention is directed towards having a computer determine its own probability and priority through analysis of answers to questions presented to the sales representative throughout the sales cycle. In a preferred embodiment, intelligent response technology is used to enable the computer to provide messages of advice as to how to strategize to win the sale, regardless of whether the computed probability is the same or different from the probability calculated using the salesperson's gut feel answers to the two above questions. The probability and priority values are used together with features of the sales model to construct reports advising where the representative should best spend his time. These reports can, for instance, use the information stored in the sales model to assess whether sufficient customer interactions have occurred, or whether sufficient information has been gained at a particular point in the sales cycle.

It will be apparent to persons skilled in the art that many variations to the embodiments described above are contemplated. For example, it is possible to implement a certain portion of the invention in a paper-based system, though it is unlikely that this would be the method of choice, considering technology is a comparatively inexpensive option for the average business.

The forgoing description is clearly by way of example only and is not meant to limit the scope of protection to be accorded to the invention, which scope is defined by the following claims.

We claim:

1. A computer implemented method of assisting a sales representative with prioritizing a plurality of sales opportunities, comprising the steps of:
    for each of the sales opportunities, determining using a computer a probability from a finite number of possible probability values that the sales representative will ultimately win the sale;
    establishing, using the computer, a sales cycle time line for each of the sales opportunities and dividing each of the respective sales cycle time lines into a uniform number and type of selling phases;
    for each sales opportunity, assigning using the computer a time-dependent priority value based on the determined probability values for the sales opportunity and the selling phase that the sales opportunity is in at the time that the priority value is assigned; and
    providing on a visual display for the sale representative an indication of the time-dependent priority value assigned to at least one of the sales opportunities,
    and further including establishing and storing on the computer relative priority indices for each unique combination of possible probability values and possible selling phase, wherein said priority values are based on the relative priority indices.

2. The method of claim 1 wherein each of the sales opportunities are divided into a probing phase during which probing type skills dominate the sales opportunity, a proving phase during which proving type skills dominate the sales opportunity, and a closing phase during which closing skills dominate the sales opportunity.

* * * * *